Aug. 14, 1945.    J. A. HICKS    2,382,224
FLUID PRESSURE CONTROL UNIT FOR LAUNDRY MACHINES AND THE LIKE
Filed Dec. 6, 1943    17 Sheets-Sheet 1

INVENTOR.
JAMES A. HICKS, DECEASED,
ROBERT L. HOLBROOK, ADM.
BY
Cushman, Darby & Cushman
ATTORNEYS.

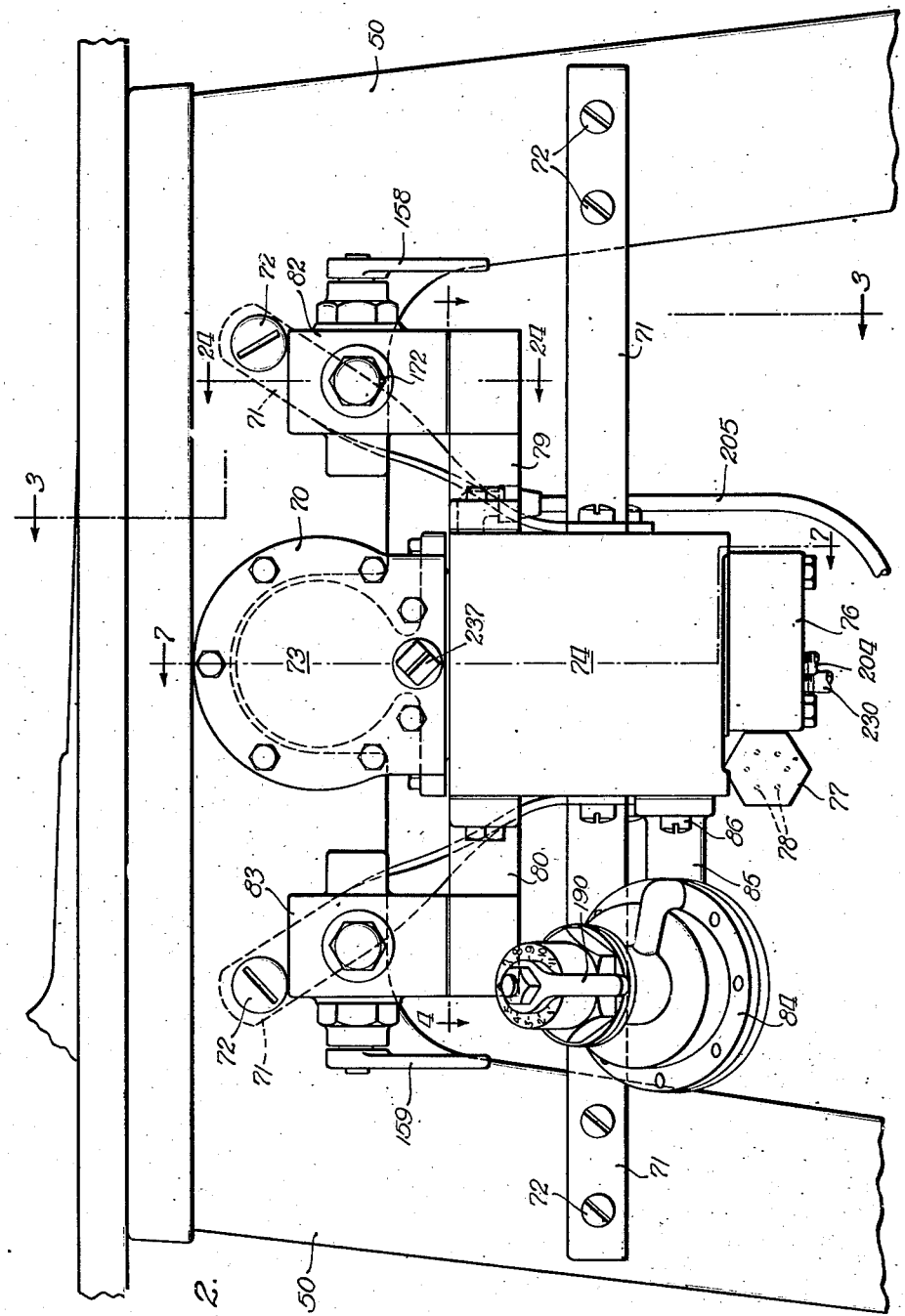

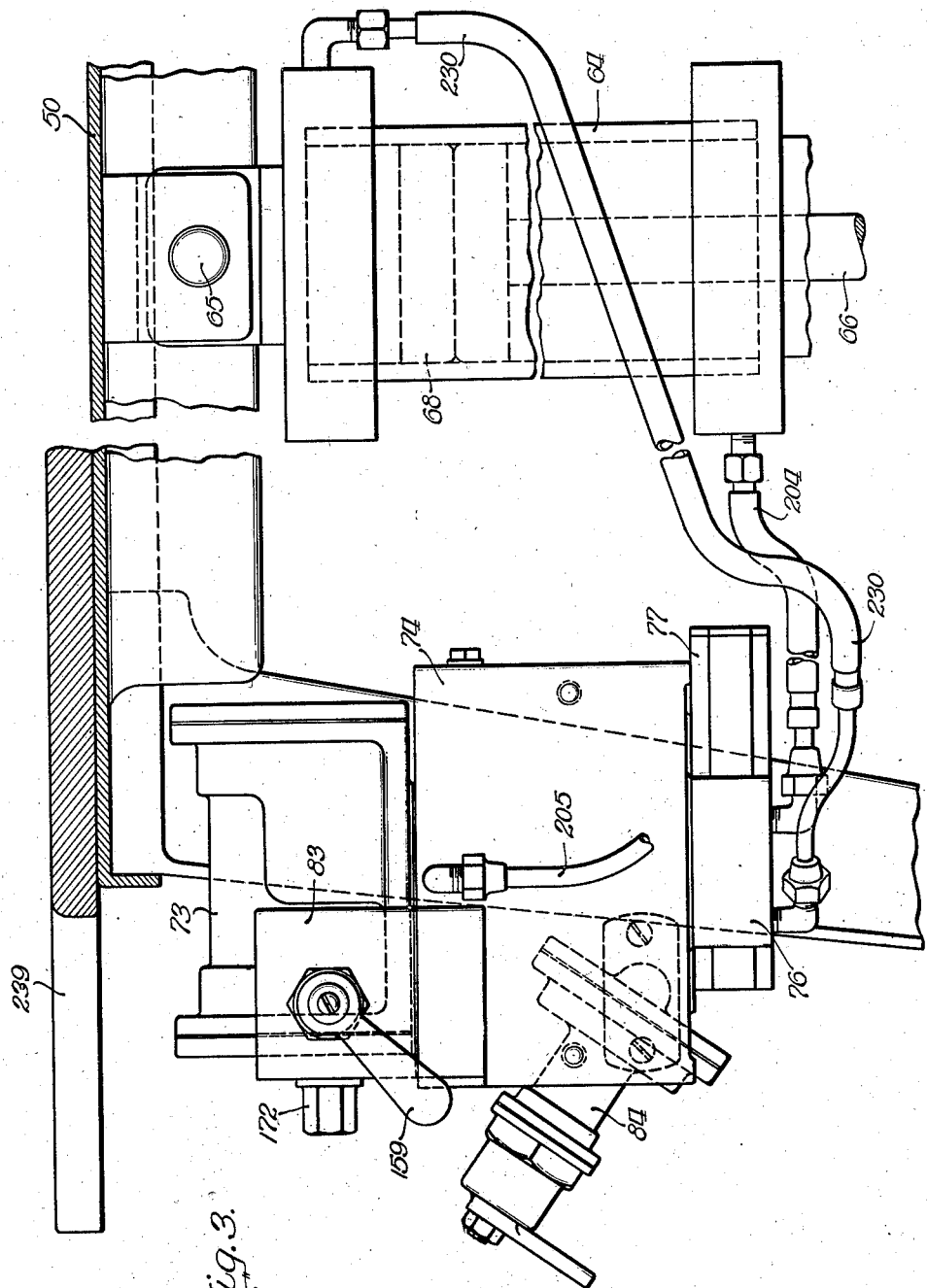

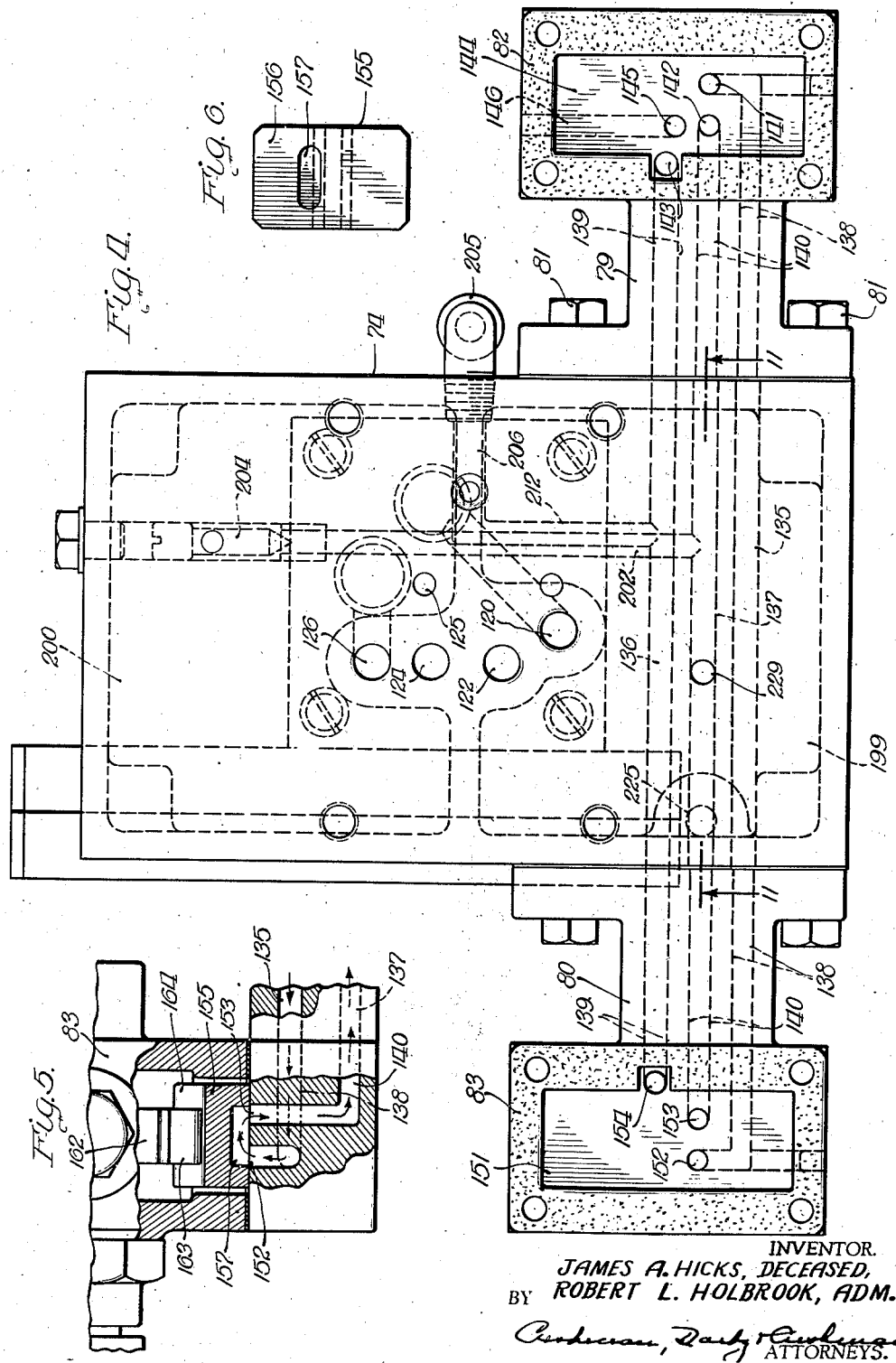

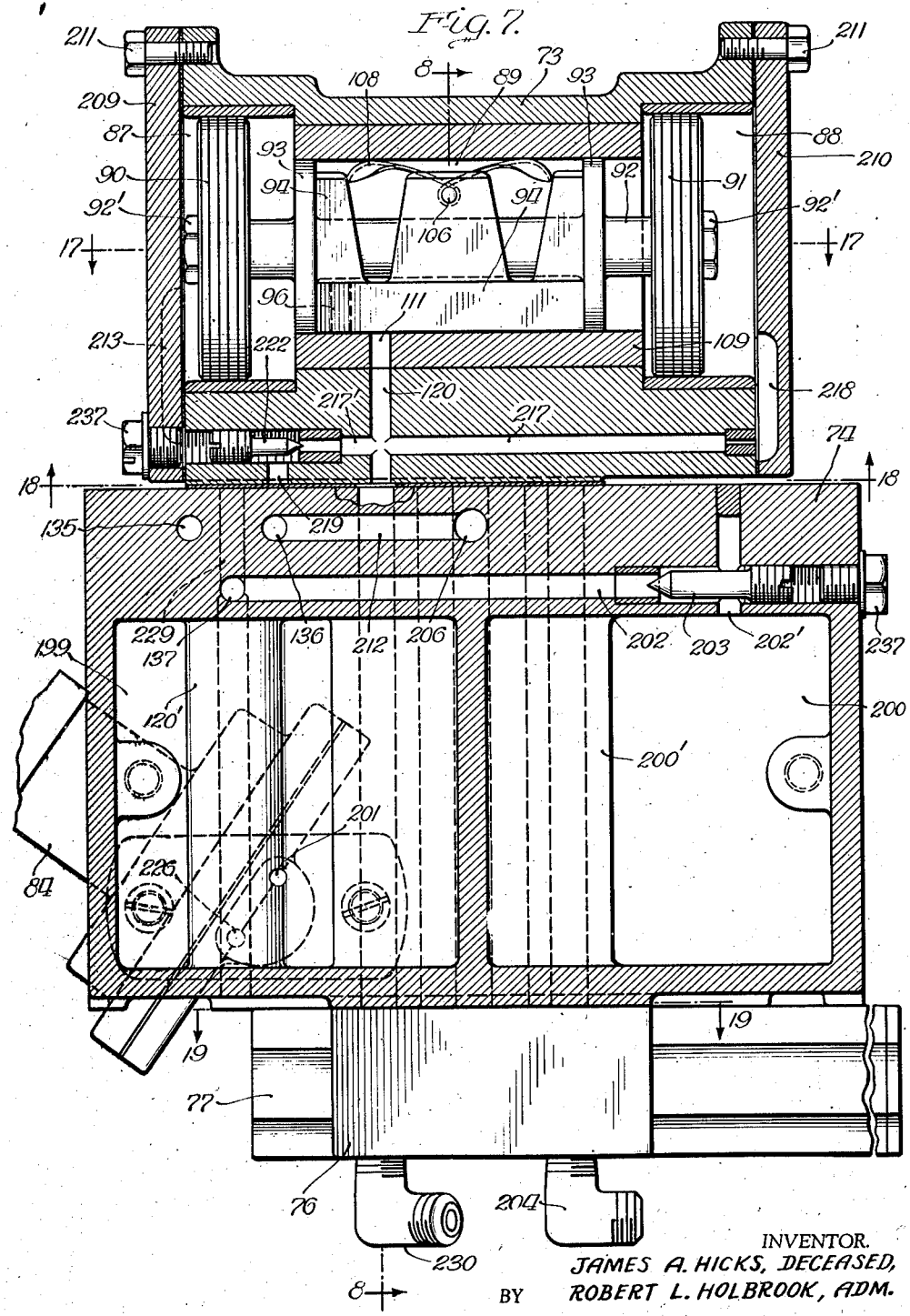

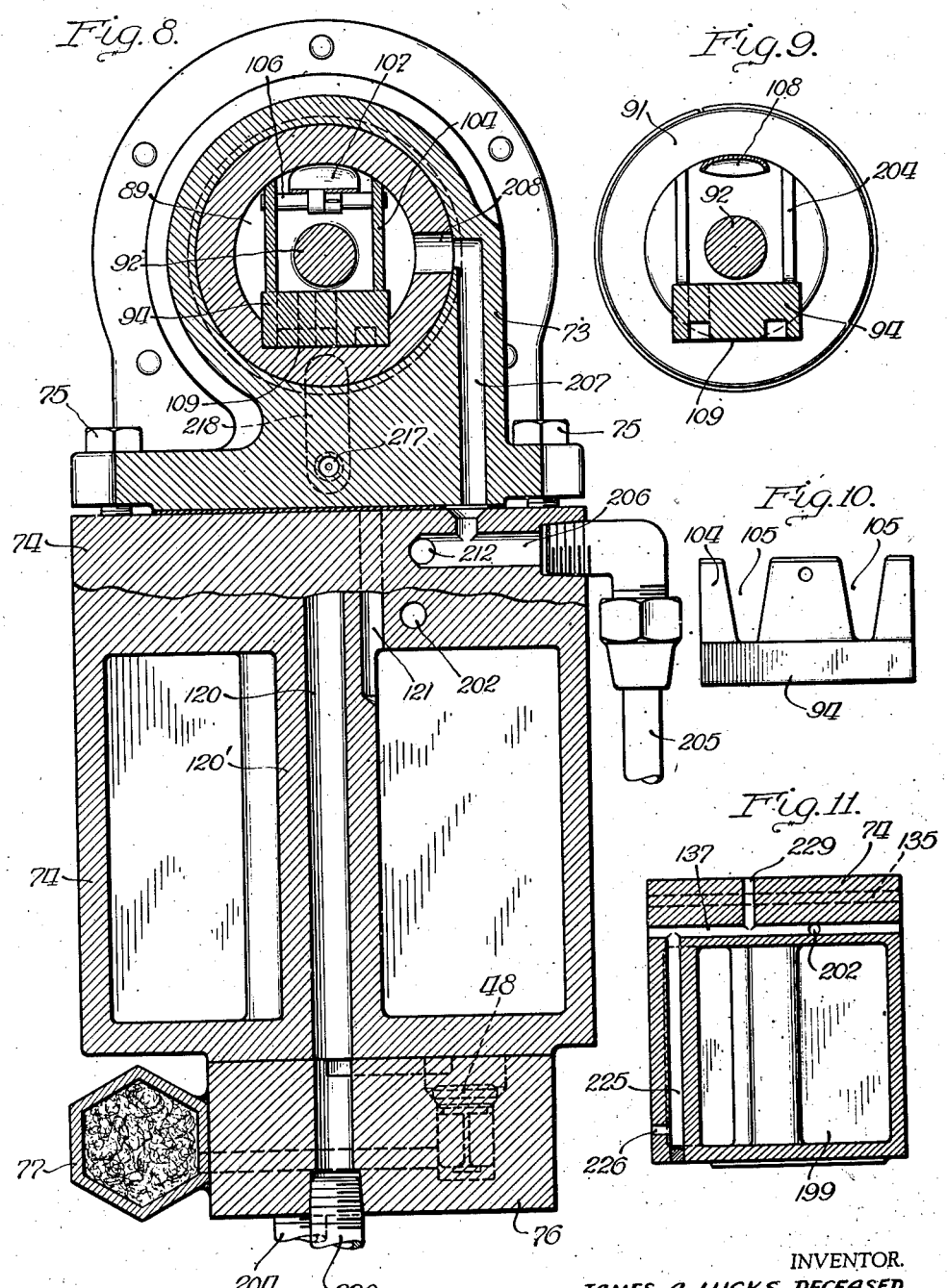

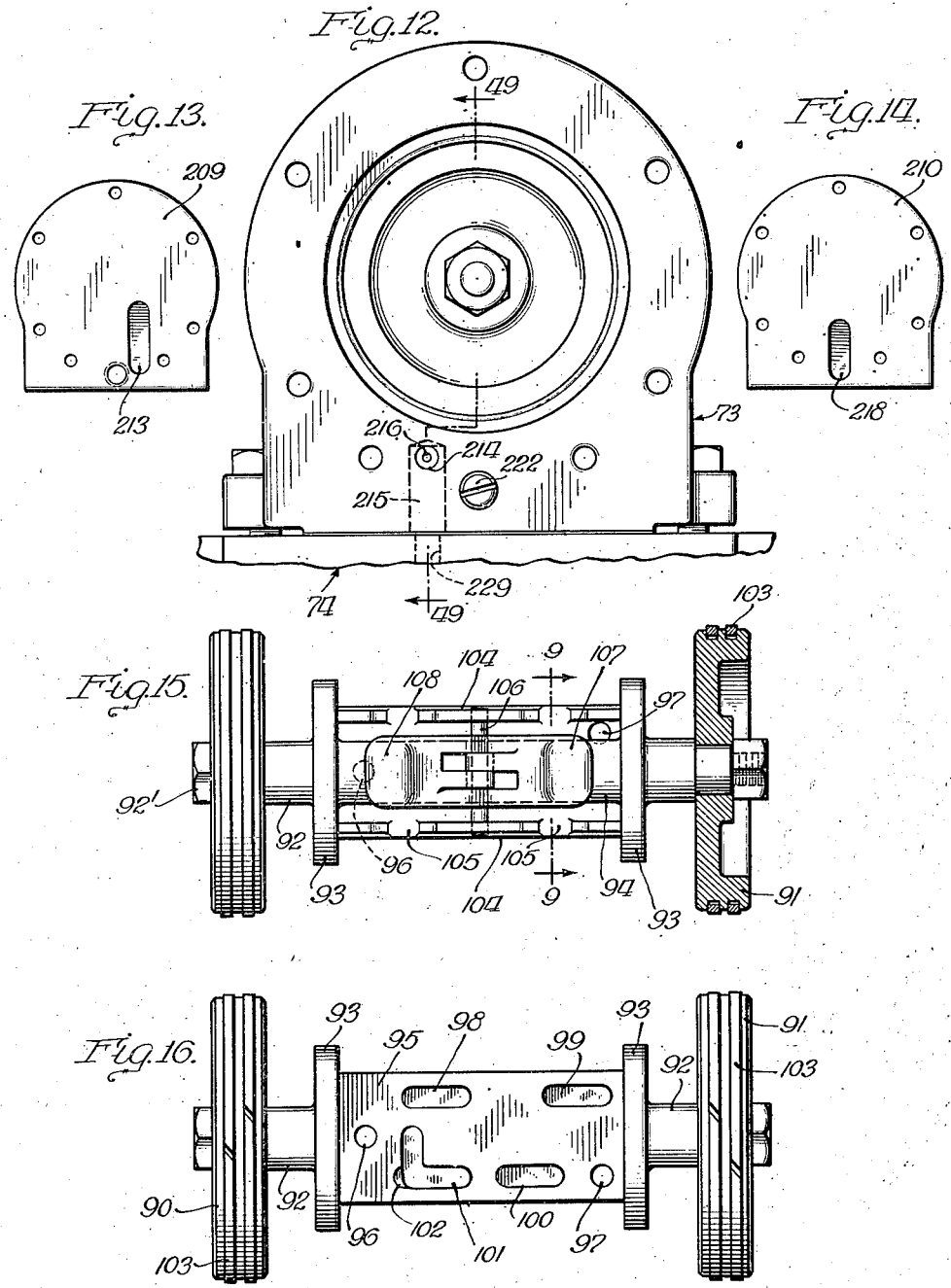

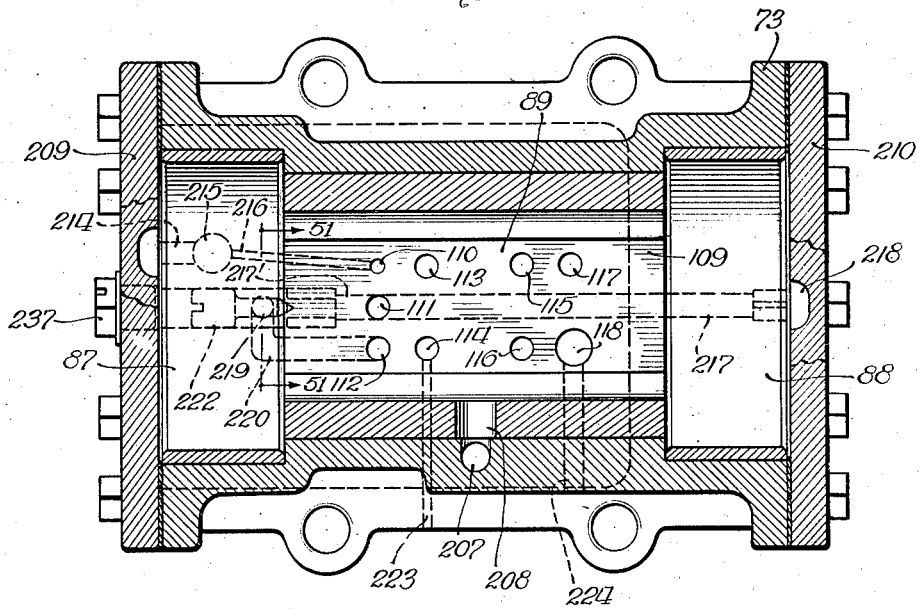

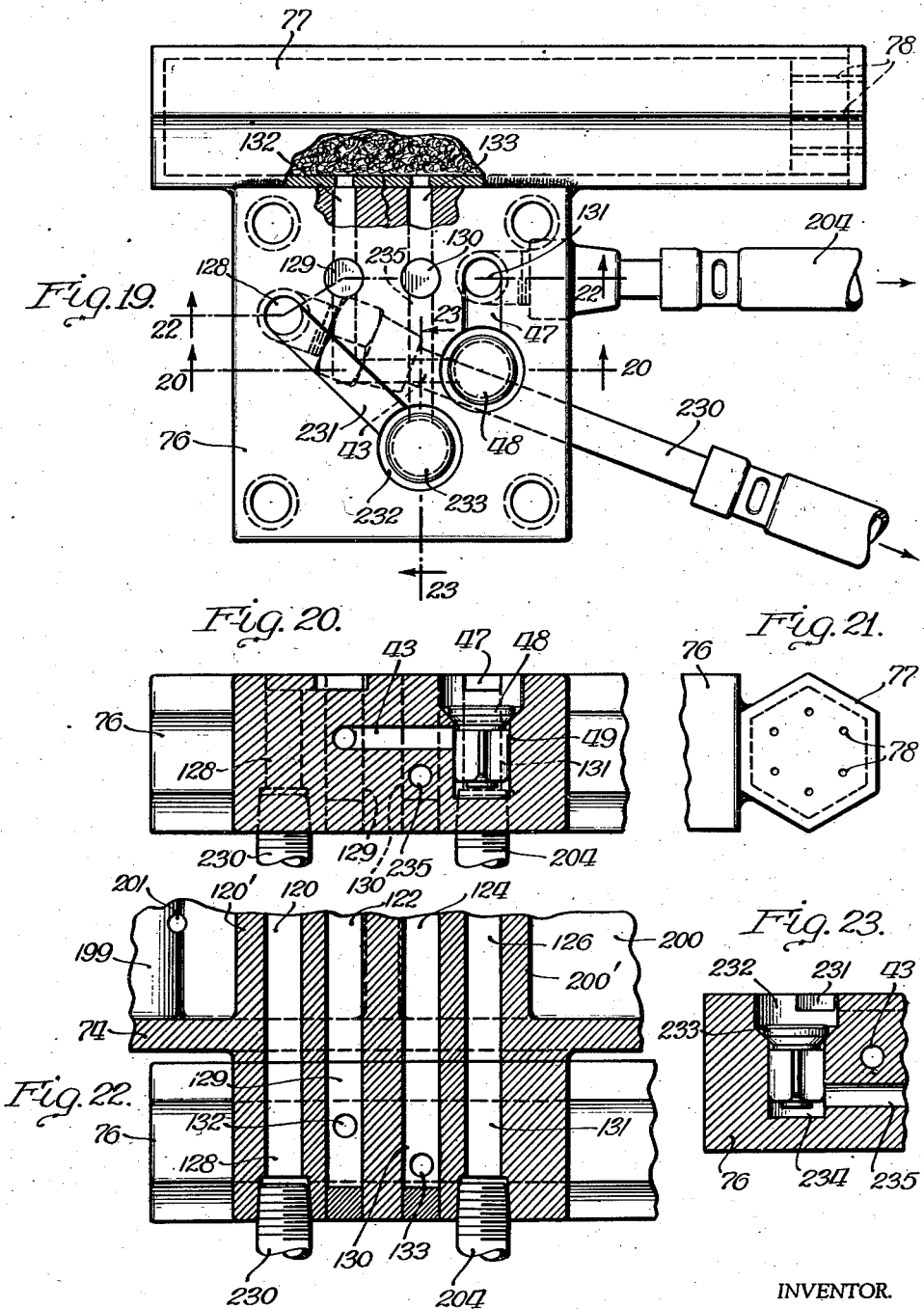

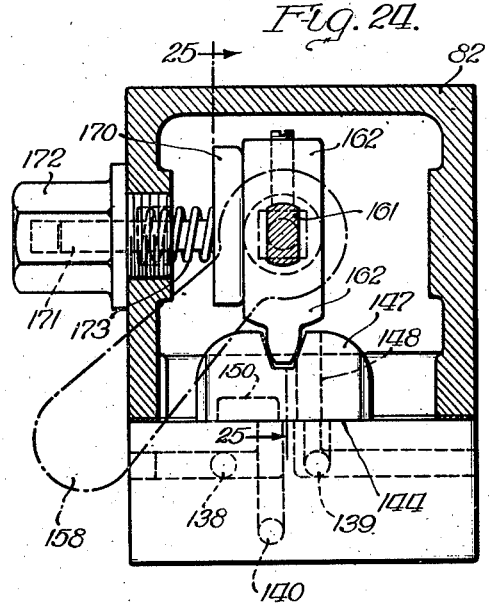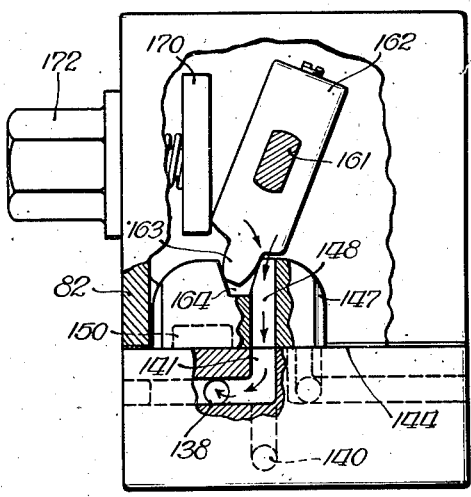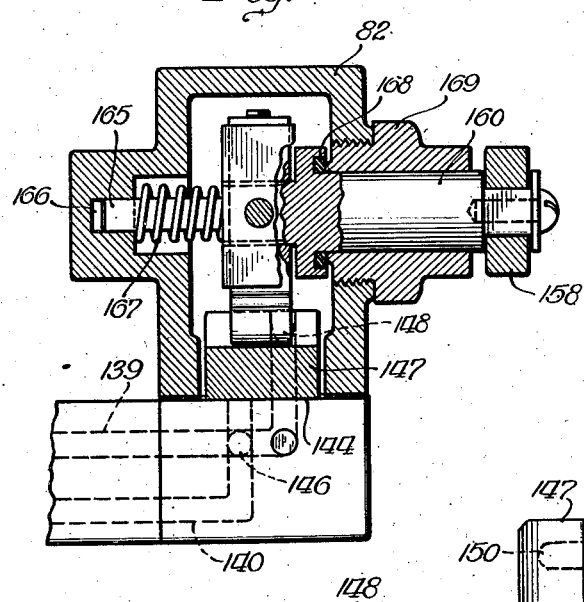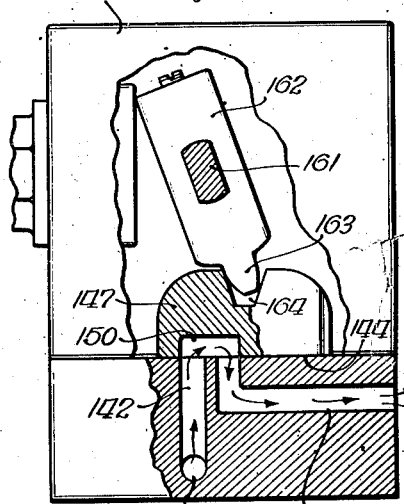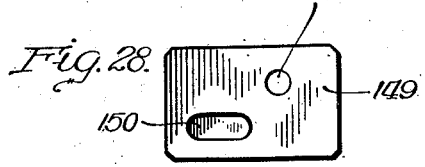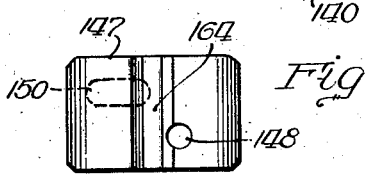

Aug. 14, 1945.  J. A. HICKS  2,382,224
FLUID PRESSURE CONTROL UNIT FOR LAUNDRY MACHINES AND THE LIKE
Filed Dec. 6, 1943  17 Sheets-Sheet 11
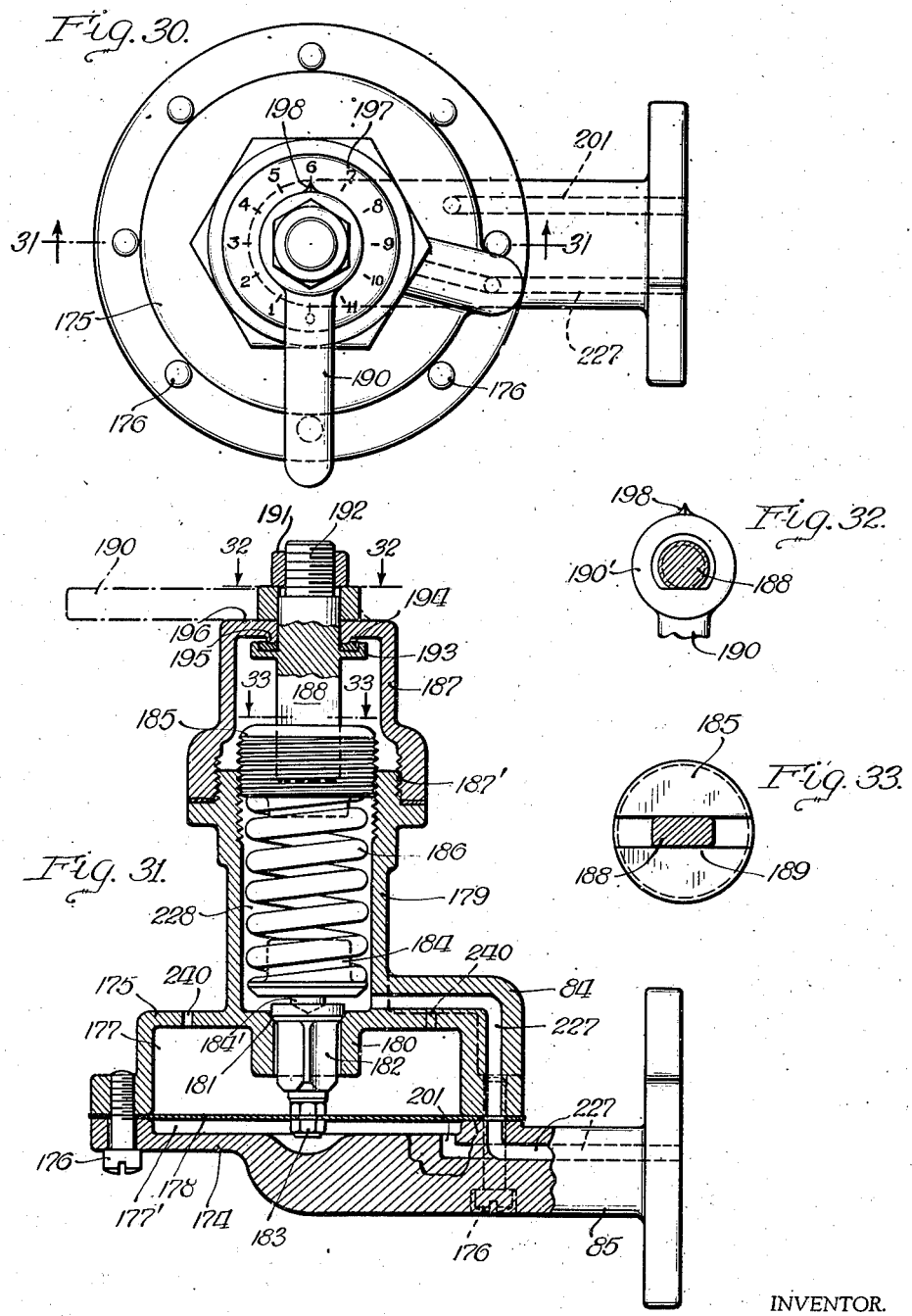
INVENTOR.
JAMES A. HICKS, DECEASED,
BY ROBERT L. HOLBROOK, ADM,
ATTORNEYS.

INVENTOR.
JAMES A. HICKS, DECEASED,
BY ROBERT L. HOLBROOK, ADM.

ATTORNEYS.

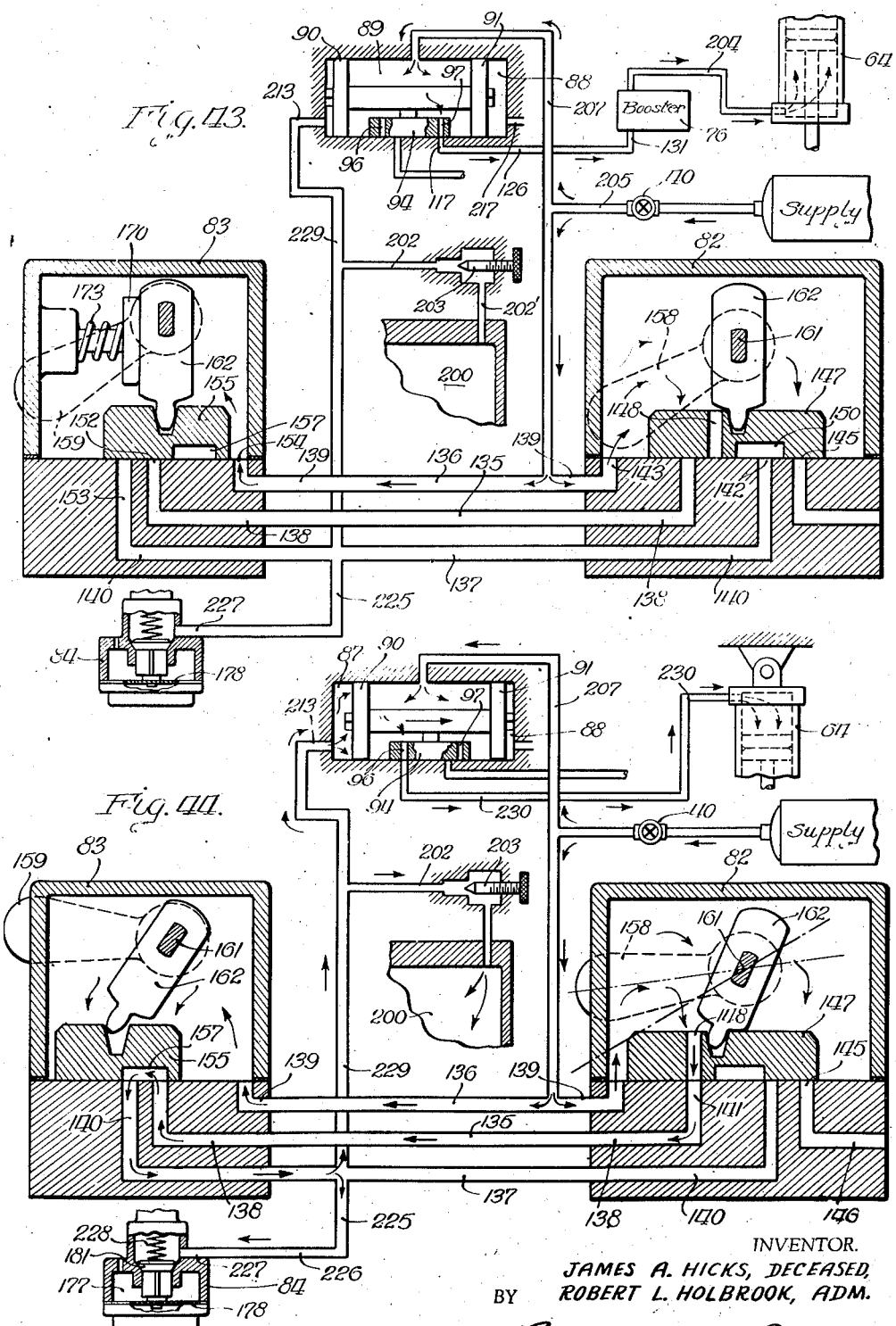

Aug. 14, 1945.  J. A. HICKS  2,382,224
FLUID PRESSURE CONTROL UNIT FOR LAUNDRY MACHINES AND THE LIKE
Filed Dec. 6, 1943   17 Sheets-Sheet 14

INVENTOR.
JAMES A. HICKS, DECEASED,
BY ROBERT L. HOLBROOK, ADM.
ATTORNEYS.

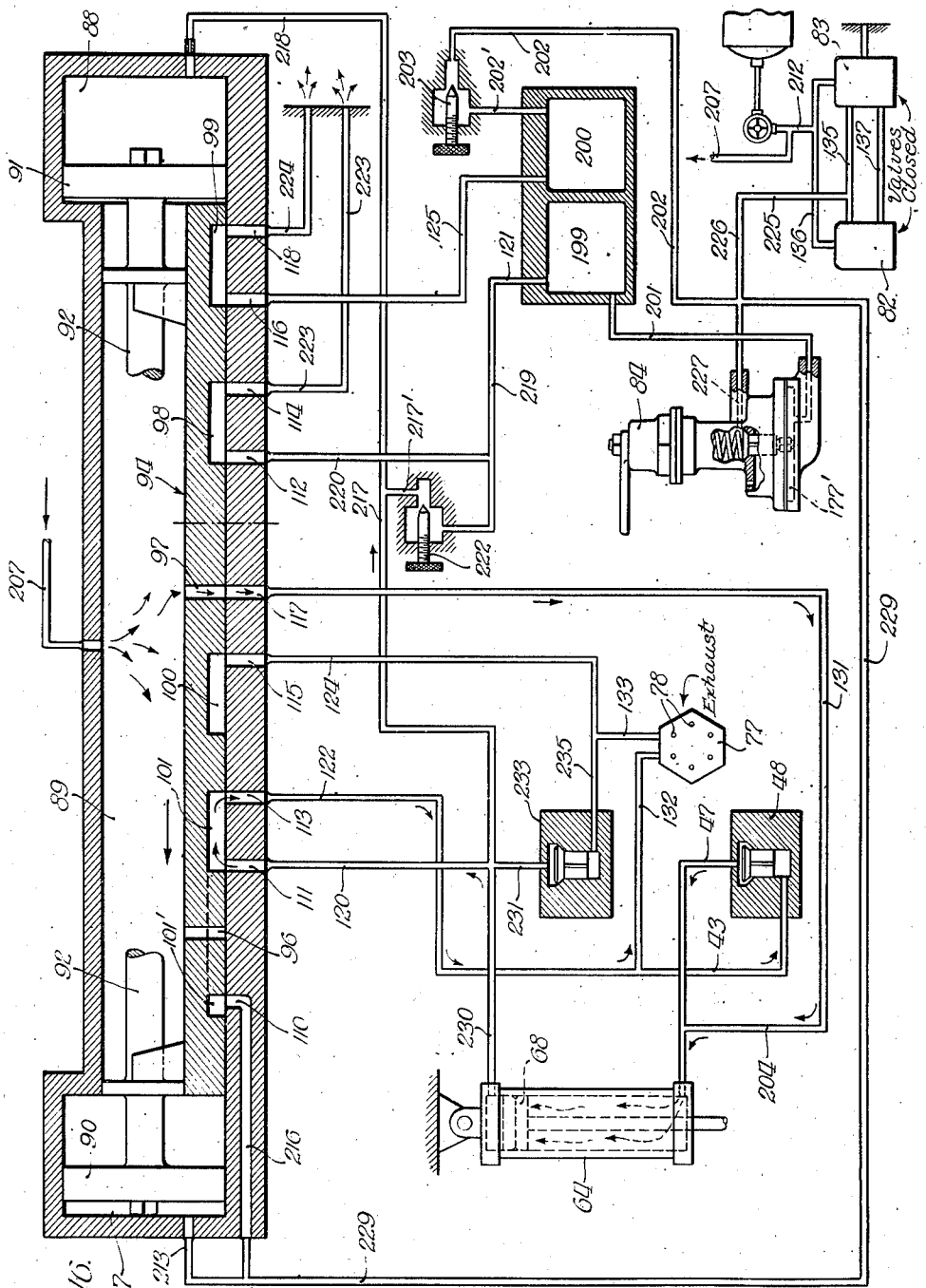

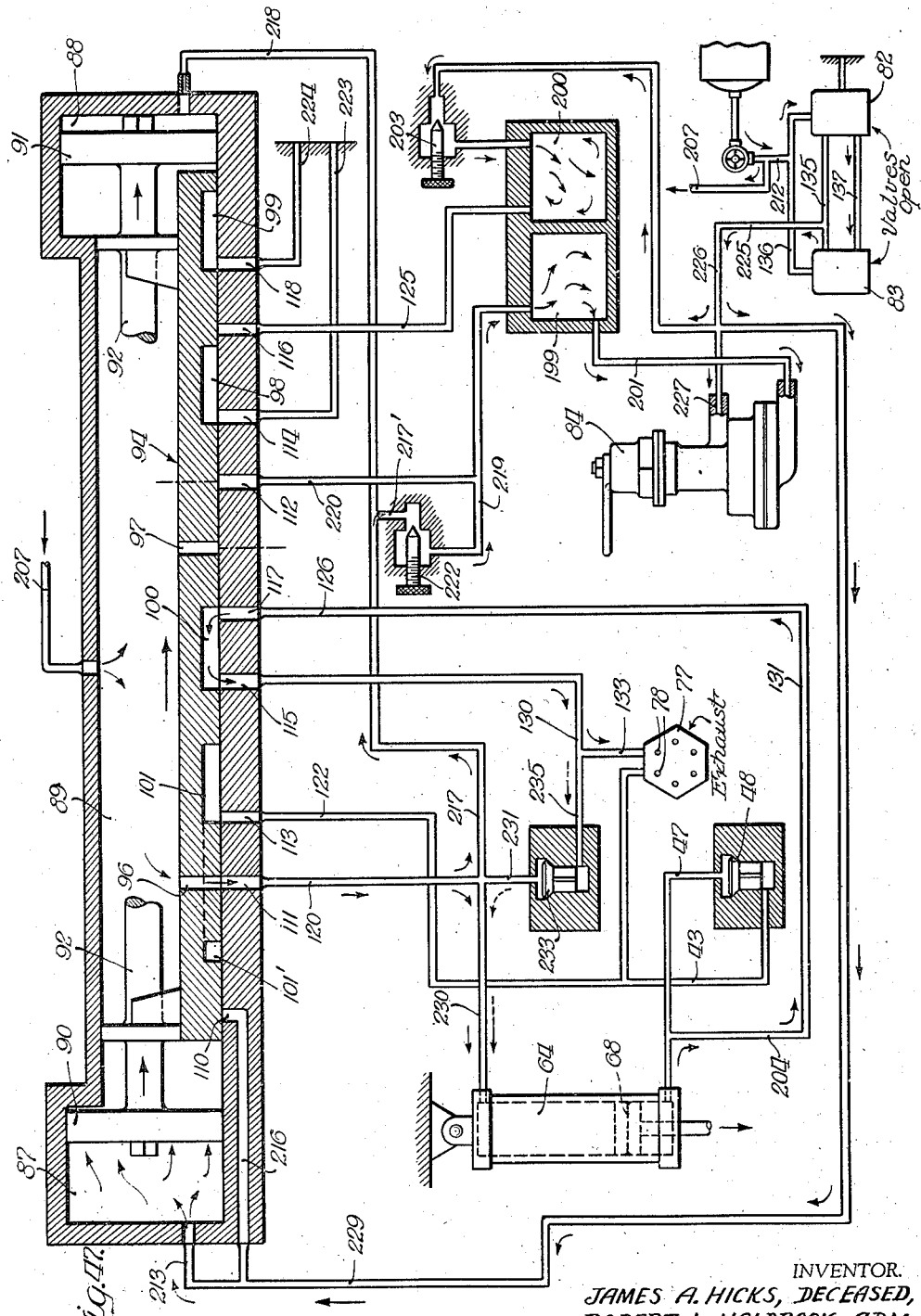

Aug. 14, 1945.   J. A. HICKS   2,382,224
FLUID PRESSURE CONTROL UNIT FOR LAUNDRY MACHINES AND THE LIKE
Filed Dec. 6, 1943   17 Sheets-Sheet 17
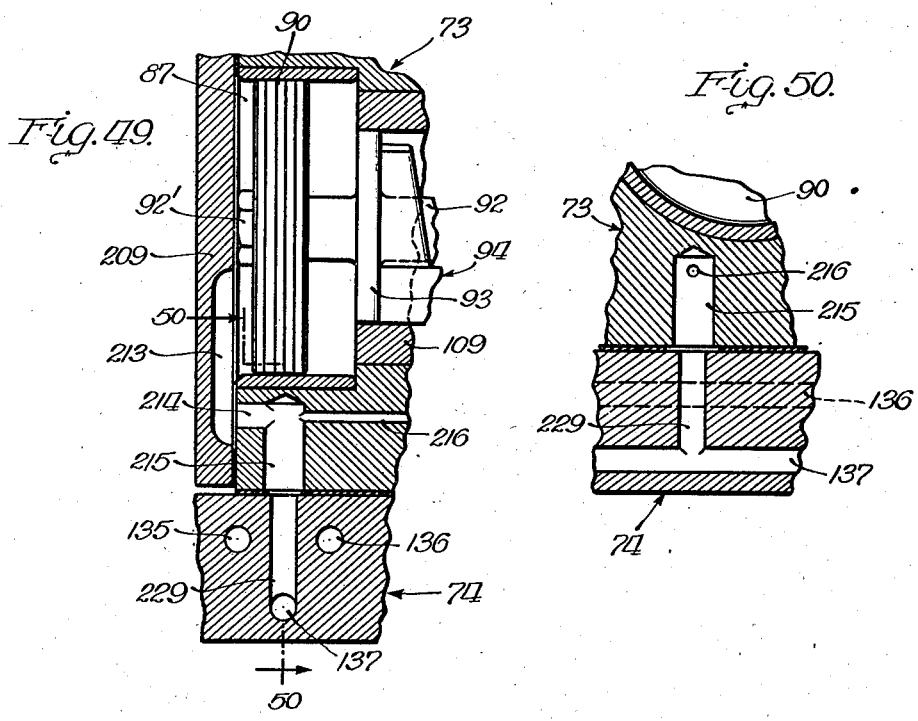
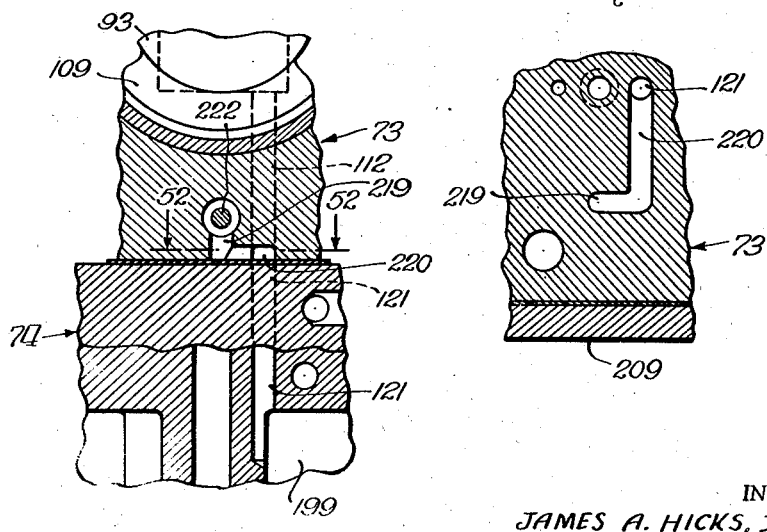
INVENTOR.
JAMES A. HICKS, DECEASED,
BY ROBERT L. HOLBROOK, ADM.

Patented Aug. 14, 1945

2,382,224

UNITED STATES PATENT OFFICE 2,382,224

FLUID PRESSURE CONTROL UNIT FOR LAUNDRY MACHINES AND THE LIKE

James A. Hicks, deceased, late of Atlanta, Ga., by Robert L. Holbrook, administrator, Atlanta, Ga., assignor to A. L. Belle Isle Application December 6, 1943, Serial No. 513,207

18 Claims. (Cl. 38—40)

The present invention relates to an improved actuating mechanism for moving an operable member, such as a presser head or the like, relative to the work, and for maintaining the operable member in different positions or for automatically releasing the same.

An important feature of the invention consists in associating with the power piston of a pressing machine, an automatically operable pressure control unit which may be readily attached to machines of this type at a minimum expenditure of time and labor, or which may be installed on new equipment to provide a simple, efficient, and economical means for controlling the operation of the presser head or other operable member to which the unit may be connected, and which successfully meets the most exacting demands of the best working conditions imposed by machines of this type.

Heretofore, in presses of this type, the presser head had to be moved through a predetermined path or distance and could not be locked until it had completed its full closing stroke. An essential object of the present invention consists in providing an automatic locking means for maintaining the presser head in firm engagement with the work or the buck for a predetermined period, and for automatically releasing the presser head at the expiration of this period, and in which the locking of the presser head is unaffected by the difference in thickness or size of the material or work being pressed or treated. In other words, the presser head is moved and maintained in firm engagement with the work for the period the machine is set, without the necessity of adjusting, disturbing, or rearranging the parts of the control unit, even though the work first treated be of greater or lesser thickness and size than that subsequently treated.

A further object comprehends the provision of simple, efficient, and economical means which are operatively connected to an actuating member so as to move and maintain the same in different positions, and which automatically retains the actuating member in its different positions for a predetermined period or which may be operated to release the actuating member at any time as the particular work to be done requires.

Another object consists in the provision of a presser head which is normally moved and maintained in its release or inoperative position relative to the work, and associating with the presser head a control unit having spaced manually operable valves normally positioned to maintain the presser head in its release position, and which upon the simultaneous operation of the valves and the holding of the valves for a predetermined interval in their "opened" positions, automatically maintains the presser head in contact with the work for a predetermined period, and at the expiration of this period automatically releases the head from the work. The manually operable valves have associated therewith means constructed and arranged so that after the valves have been simultaneously operated to close the press they will, upon being released, before the expiration of the predetermined period, for which the machine has been set, cause the presser head to be returned to its raised or opened position.

Another object consists in providing an automatic valve housing with a chamber in which is mounted a slide valve operable by an application piston and a release piston. The fluid pressure medium is introduced between the pistons and above the slide valve in order to produce a balance pressure and to maintain the slide valve seated. The pressure medium is also conducted selectively to the outer faces of each of the application and release pistons to control the axial movement of the pistons and the slide valve during the operation of the machine.

Another object consists in associating with a garment or ironing press, a pressure control unit having governor means for maintaining the press in its closed position for a predetermined period, and for automatically releasing the press at the expiration of this period. Additionally, the control mechanism has means to effect the release of the press at any time irrespective of the period it has been set by the governor to be held in its locked position. Thus it will be seen that a battery of pressing machines may be positioned so as to be controlled by a single operator, by the proper setting of the governor to raise or move the presser heads in sequential order, so that the operator may remove and apply material to be treated or pressed to a number of machines.

A still further object consists in associating with the control unit, automatic safety means for maintaining the parts in different positions so as to eliminate the danger of injuring the operator and also for increasing the efficiency of the machine.

Other objects and advantages of the invention will become apparent from the following description when taken in conjunction with the accompanying claims and drawings.

Referring to the drawings in which is disclosed a preferred embodiment of the invention:

Figure 2 is a fragmentary front view of Figure 1;

Figure 3 is a sectional view taken substantially along the line 3—3 of Figure 2;

Figure 4 is a plan view taken substantially along the line 4—4 of Figure 2;

Figure 5 is a sectional view of the left hand manually operable valve, with the parts in operative position;

Figure 6 is a bottom face view of the slide valve shown in Figure 5;

Figure 7 is a sectional view taken substantially along the line 7—7 of Figure 2;

Figure 8 is a sectional view taken substantially along the line 8—8 of Figure 7;

Figure 9 is a sectional view taken substantially along the line 9—9 of Figure 15;

Figure 10 is a detail side view of the automatic slide valve shown in Figure 9;

Figure 11 is a sectional view taken substantially along the line 11—11 of Figure 4;

Figure 12 is a front elevation of the automatic valve showing the front cap or cover removed;

Figure 13 is a detailed inside view of the front cover;

Figure 14 is a detailed inside view of the rear cover;

Figure 15 is a plan view of the application and release pistons, main slide valve, and their associated parts;

Figure 16 is a bottom face view of Figure 15;

Figure 17 is a sectional view taken substantially along the line 17—17 of Figure 7 with the slide valve and pistons removed;

Figure 18 is a sectional view taken substantially along the line 18—18 of Figure 7;

Figure 19 is a sectional view taken substantially along the line 19—19 of Figure 7;

Figure 20 is a sectional view taken substantially along the line 20—20 of Figure 19;

Figure 21 is a detailed front view of the exhaust end of the muffler shown in Figure 19;

Figure 22 is a sectional view taken substantially along the line 22—22 of Figure 19;

Figure 23 is a sectional view taken substantially along the line 23—23 of Figure 19;

Figure 24 is a sectional view taken substantially along the line 24—24 of Figure 2 showing the right hand slide valve in its neutral position;

Figure 25 is a sectional view taken substantially along the line 25—25 of Figure 24;

Figure 26 is a view similar to Figure 24 showing the slide valve and its associated parts in their applied or operative position;

Figure 27 is a view similar to Figure 24 showing the right hand valve in its manually released position;

Figure 28 is a bottom face view of the slide valve shown in Figure 24;

Figure 29 is a plan view of the slide valve shown in Figure 28;

Figure 30 is a detailed plan view of the pressure governor;

Figure 31 is a vertical sectional view of the governor taken substantially along the line 31—31 of Figure 30;

Figure 32 is a sectional view taken substantially along the line 32—32 of Figure 31;

Figure 33 is a sectional view taken substantially along the line 33—33 of Figure 31;

Figure 43 is a diagrammatic view of parts of the control unit showing the main slide valve and the manually operable or auxiliary slide valves in their neutral position and with the pressure supply turned on;

Figure 44 is a diagrammatic view similar to Figure 43 showing the manually operable slide valves in their open position;

Figure 46 is a diagrammatic view of the control unit and its associated parts in their released or inoperative positions;

Figure 47 is a diagrammatic view similar to Figure 46 with their parts in the applied or operative positions;

Figure 49 is a sectional view taken substantially along the line 49—49 of Figure 12;

Figure 50 is a sectional view taken substantially along the line 50—50 of Figure 49;

Figure 51 is a detail sectional view taken substantially along the line 51—51 of Figure 17, and Figure 52 is a detail sectional view taken substantially along the line 52—52 of Figure 51.

Figure 1:
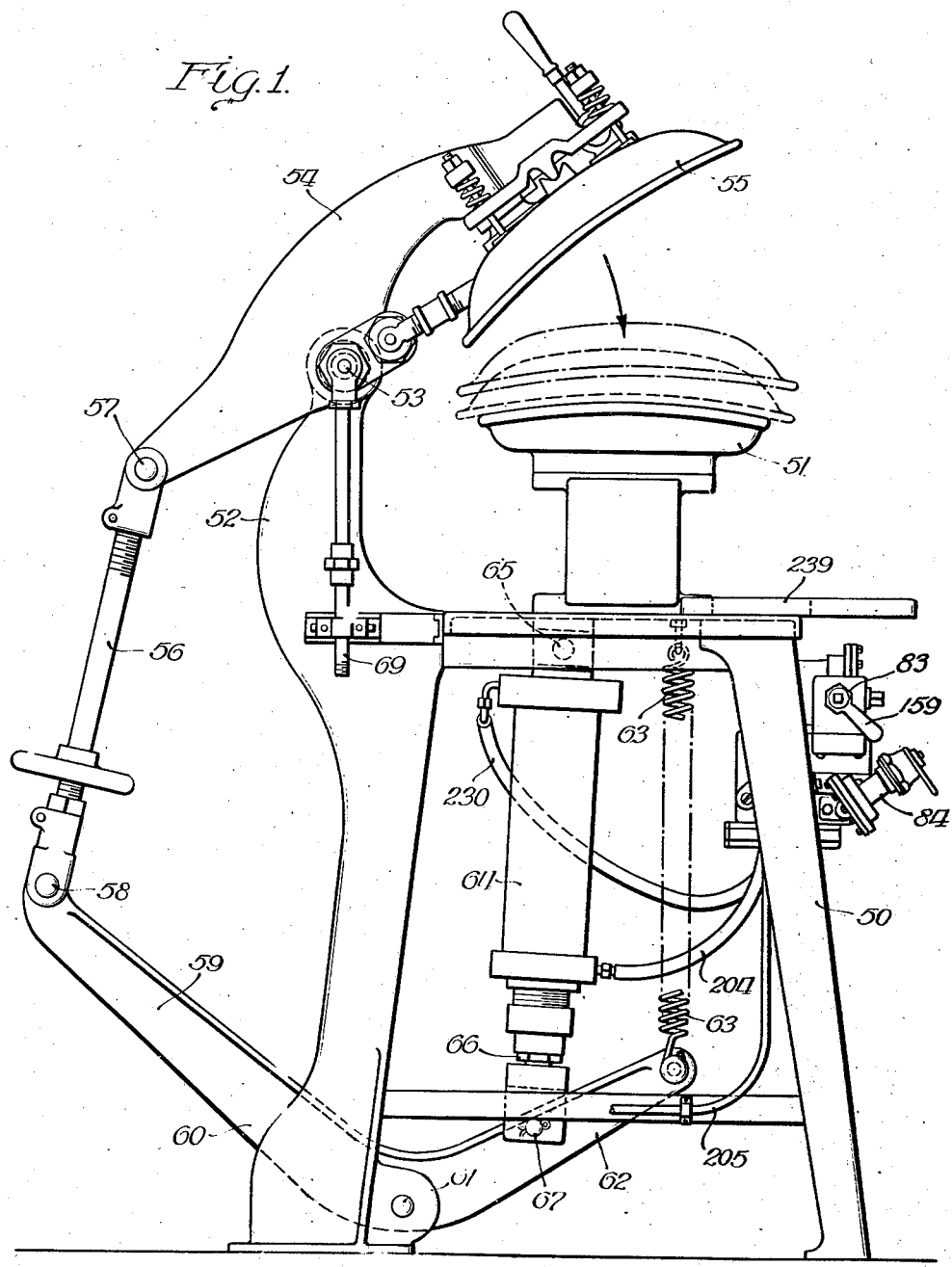
Figure 1 is a side elevation of a press having my improved control unit associated therewith.

For the purpose of illustration, the automatic pressure controlled unit is shown associated with a pressing or ironing machine of any well known and standard construction. The machine may comprise a supporting frame 50 (Figure 1) on which is mounted the pressing buck 51. Extending upwardly from the rear of the frame is an arm 52 to which is pivotally connected as at 53, a lever 54, which at its forward end carries a presser head 55 arranged to be moved into and out of pressing engagement with the buck 51, as indicated in dotted lines in Figure 1. An adjustable link or rod 56 is connected as at 57 to the rear end of the lever 54 and is secured at its opposite end, as at 58, to the long arm 59 of a bell-crank lever 60 pivoted at 61 to the frame. The short arm 62 of the bell-crank may be connected to a spring 63 which in turn is secured to the frame so as to urge the presser head 55 away from the buck 51. A fluid motor or pressure cylinder 64 is pivotally connected at its upper end as at 65 to the frame, and has a piston rod 66 pivotally connected as at 67 to an intermediate portion of the short arm 62 of the bell-crank. Within the cylinder 64 is a reciprocating piston 68 (Figure 3) to which is connected the rod 66 so as to move the presser head 55 towards and away from the buck 51 upon alternately introducing and discharging a fluid pressure medium, such as air, steam, or the like, into the cylinder 64 on opposite sides of the piston 68, in a manner subsequently to be described. The buck and the presser head may be provided with heating chambers arranged to be supplied with steam through the pipe 69 so as to apply the desired heat to the garment or article being pressed or ironed by the machine, and this steam may be utilized to operate the motor 64.

General description

In order to provide simple, positive, and economical means for efficiently operating the presser head 55 or other suitable operable member so as to apply a proper and uniform application of pressure on the work, an automatically releasable and time operable pressure control unit generally designated as 70 (Figure 2) is preferably connected to the front of the machine, by the spaced metallic straps 71 and the screws 72. The control unit 70 is constructed and arranged to be very compact and readily accessible for inspection or repair, and may be attached to standard pressing machines to increase their efficiency of operation at a minimum expenditure of time and effort, or may be installed as new equipment on various kinds of machines in which a power cylinder or operable member is arranged to be actuated by fluid pressure. The control unit 70 essentially comprises an automatic main slide valve housing 73 (Figure 7) mounted on a reservoir or receptacle 74 by the threaded bolts 75 (Figure 8). Secured to the underside or bottom of the reservoir 74 is a booster or pressure saving member 76 which has connected to one side thereof a muffler 77 communicating with the atmosphere through the perforations or openings 78 in its outer end (Figure 21). Secured to opposite sides of the reservoir 74 are supporting brackets or arms 79 and 80 (Figure 4), by the threaded bolts 81. At their outer ends the brackets 79 and 80 are shaped to form the spaced slide valve housings 82 and 83, respectively. A pressure control governor 84 (Figure 2) may be connected to one side of the reservoir 74 by the flanged arm or bracket 85 and the threaded bolts 86 so that all of the parts of the control unit are conveniently positioned adjacent one another and may readily be attached to a machine or removed therefrom.

The main valve housing 73 (Figure 7) is formed at its ends with enlarged chambers 87 and 88, respectively, one of which, such as the chamber 87, constitutes the application chamber and the other, 88, the release chamber. Between these two space chambers is a main supply chamber 89 into which the fluid pressure medium is introduced and discharged to various parts of the control unit during the operation of the press. An application piston 90 in the chamber 87 is connected to a release piston 91 in the chamber 88 by a common piston rod or shaft 92 extending lengthwise through the chamber 89, so that these pistons are simultaneously operable upon the variation of pressure in the chambers 87 and 88. The pistons 90 and 91 may be detachably connected to the rod 92 by the threaded nuts 92'. The portion of the shaft 92 within the chamber 89 has a pair of spaced collars or flanges 93 between which is carried a main slide valve 94 (Figure 16) provided with its bottom face 95 (Figure 16) provided with vertical through openings 96 and 97 and elongated cavities or slots 98, 99 and 100 and a substantially L-shaped cavity 101 having a notched or recessed portion 102. The periphery of the pistons 90 and 91 may have spaced slit rings 103 for engaging the inner wall of the chambers 87 and 88 during the reciprocating movement of the pistons to prevent the escape of the fluid pressure from one side of the pistons to the other. The slide valve 94 has upwardly extending spaced sides 104 which may be longitudinally interrupted as at 105 (Figure 10). Confined between the side walls 104 by the transverse pin 106 (Figure 15) is a spring 107 which has bent arms 108 extending longitudinally of the chamber 89 so as to engage the adjacent wall thereof in order yieldably to maintain the slide valve 94 in firm engagement with its seat 109 (Figure 7). The valve set 109 (Figure 17) has spaced openings or passages 110, 111, 112, 113, 114, 115, 116, 117, and 118 which register with complementary formed passages or openings 119, 120, 121, 122, 123, 124, 125, 126 and 127, respectively, on the bottom of the housing 73 (Figure 18). The passages 120, 122, 124 and 126 (Figure 4) extend downwardly through the reservoir 74 and register with aligned passages 128, 129, 130 and 131, respectively in the booster 76 (Figure 22). The passages 129 and 130 (Figure 19) are closed at their lower ends and have lateral ports 132 and 133 communicating with the muffler 77 so as to discharge the fluid to the atmosphere through the muffler openings 78.

The forward end of the reservoir 74 has three transverse opennigs 135, 136 and 137 (Figure 7) which extend therethrough and register with aligned openings 138, 139 and 140 in each of the slide valve housings 82 and 83, respectively (Figure 4). The passages 138, 139 and 140 in the right hand valve housing 82 terminate in the ports 141, 143 and 142 respectively, on the valve seat 144. The valve seat 144 also has an opening 145 leading through the passage 146 to the atmosphere (Figure 27). Mounted in the housing 82 is a slide valve 147 (Figure 24) provided with a vertical through opening 148 and having in its bottom face 149 an elongated cavity or slot 150 (Figure 28). The cavity 150 is arranged to establish communication between the ports 142 and 145 in the valve seat 144 when the handle 158 of this valve is raised. The opening 148 moves in registration with the port 141 when the handle 158 is depressed. The valve seat 151 in the left hand valve housing 83 (Figure 4) has three openings 152, 153 and 154 which correspond and communicate with the complementary openings 141, 142 and 143 in the right hand valve housing 82. A reciprocating slide valve 155 (Figure 5) is mounted in the left hand valve housing 83 and has its bottom face 156 (Figure 6) formed with a transverse cavity 157 arranged to establish communication between the ports 152 and 153 when the handle 159 of this valve is raised. The auxiliary slide valves 147 and 155 in their normal or neutral positions blank their complementary ports or openings. Each of the handles 158 and 159 is connected to a complementary rotatable shaft 160 (Figure 25). Each shaft 160 has a flat portion 161 which extends through a similarly shaped opening in an oscillatable member or arm 162 to support the same (Figure 26). The lower end of each member 162 has a projection or tooth 163 which fits into a complementary recess 164 in the top of each of the slide valves 147 and 155 so that rotations of the shafts 160, by the actuation of their handles, impart a reciprocated movement to their corresponding slide valves. The inner end of each shaft 160 is reduced as at 165 and is mounted within a bearing 166 in the side of each of the slide valve housings. A combined tension and torsional spring 167 (Figure 25) maintains a gasket or packing gland 168 in frictional engagement with a clamping sleeve or nut 169 and also tends to return the handle 158 to its normal position, i. e., the position in which valves 147 and 155 do not establish communication between any of their associated ports. Each of the slide valves 147 and 155 has associated therewith a cam follower 170 (Figure 24) which engages the member 162 to maintain the slide valve in its neutral position. The follower 170 is supported by a shaft 171 slidably mounted in a plug or cap 172. A coil spring 173 tends yieldably to maintain the follower 170 in engagement with the side of the member 162 so that when the latter is moved from its neutral position by handle 158 and the handle is released, the follower 170 coacts with spring 167 to return the handle and its associated parts to their neutral positions (Figure 24).

The governor 84 (Figure 31) has a base member 174 which may constitute a part of the supporting arm 85 and carries a cover 175 secured to the base by the threaded bolts 176, so as to form an automatic release chamber 177 in which is mounted a diaphragm 178 that may be secured in position by the bolts 176 when the governor 84 is assembled. The diaphragm 178 separates the chamber 177 into a lower chamber 177' which receives the fluid pressure to dilate the diaphragm 178. The cover 175 has an upwardly extending tubular portion 179 and a depending boss or bushing 180 provided with a valve seat 181 arranged to receive a reciprocating valve 182 connected at its lower end to the diaphragm 178 by the clamping nut 183. The upper surface of the valve may engage as at 184' a flange collar or retainer 184. The upper end of the tubular portion 179 is interiorly threaded to receive a plug 185 between which and the collar 184 is confined a coil spring 186 for normally urging the valve 182 against its seat. A cap 187 is threaded at 187' to the tubular portion 179 and has an opening through which extends a rotatable shaft 188. The shaft 188 at its lower end may be of rectangular shape as shown at 189 (Figure 33) so as to fit into a complementary recess in the plug 185 for the purpose of varying and controlling the tension of the spring 186. The outer end of the shaft 188 receives the hub 190' of an operating handle 190 which is maintained on the shaft 188 by a clamping nut 191 secured to the reduced threaded end portion 192 of the shaft. The shaft 188 may also have an annular flange 193 provided with a packing 194 arranged to coact with a depending annular bead or seat 195 on the inner wall of the flange 196 of the cap 187 for the purpose of maintaining the shaft 188 and its associated parts in alignment. The upper or exposed surface of the cap 187 (Figure 30) may be suitably calibrated as at 197 to coact with a pointer or indicator 198 on the hub of the handle 190 for adjusting and controlling the tension of the pressure exerted by the spring 186 on the valve 182.

The reservoir 74 (Figure 7) is divided into two separate chambers or compartments 199 and 200 for receiving and discharging the liquid pressure medium during the operation of the machine. The front compartment 199 constitutes an automatic release chamber which communicates with the main pressure chamber 89 through the slide valve 94 and with the chamber 177' beneath the diaphragm 178 of the governor (Figure 31) through a passage 201 in the base 174 in a manner and for a purpose subsequently to be described. A web 120' may extend vertically and medially through the chamber 199 and is provided with the passages 120 and 122 (Figure 8). A similar web 200' is positioned in the chamber 200 and has the passages 124 and 126 extending therethrough (Figure 22).

The rear or expansion chamber 200 communicates with a passage 202 (Figure 7) through an opening 202', and the supply to the chamber 200 is controlled by a needle valve 203 in the passage 202. The outer end of the passage 202 communicates with the transverse passage 137 in the reservoir 74 so as to conduct a portion of the main pressure going to the application chamber 87 in front of the piston 90, to the expansion chamber 200. The valve housing 73 (Figure 7) is preferably provided with a front closure plate 209 and a rear closure plate 210 which are detachably secured to the housing by the threaded bolts 211.

*Charging operation—release position*

When the supply of the pressure medium has been cut off from the control unit, the air is exhausted from the machine so that the working piston 68 (Figure 3) is in the lower portion of the cylinder 64, and the presser head 55 rests against the buck 51, while the automatic slide valve 94 (Figure 7) and its associated parts may be either in their applied or release positions. To charge the main pressure chamber 89 so as to move the presser head 55 away from the buck 51 and maintain the press open, any suitable fluid pressure medium, such as compressed air, steam, or the like, is conducted from a source of supply to the machine through a pipe 205 (Figure 8) which delivers to a port 206 in the reservoir 74. A portion of the supply is carried by the conduit 207 upwardly to discharge through the port 208 into the main chamber 89 between the pistons 90 and 91 and above the slide valve 94. The valve 94 is positioned between the collars 93 so that the latter serve to transmit the reciprocating motion of the shaft 92 to the valve 94. The release position of the slide valve 94 and its associated parts as diagrammatically shown in Figures 43 and 46 will be referred to as the press opening or raised position, as contrasted to the press closing or applied position as shown in Figures 44 and 47.

Figures 37, 38:
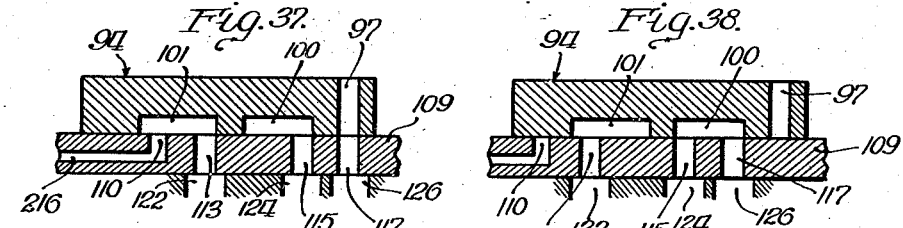
Figure 37 is a sectional view taken substantially along the line 37—37 of Figure 35.
Figure 38 is a sectional view taken substantially along the line 38—38 of Figure 36.
Figure 39:
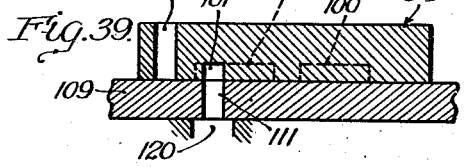
Figure 39 is a sectional view taken substantially along the line 39—39 of Figure 35.

When the main slide valve 94 is moved to its release position (Figure 35), the pressure in the chamber 89 immediately flows through the port 97 (Figure 37) in the slide valve 94 through the port 117 in the slide valve seat 109, passage 126 (Figure 22) to port 131 in the booster 76 and through the flexible connection 204 into the bottom of the cylinder 64 (Figure 3) so as to raise the piston 68 and move the presser head 55 away from the buck, where it is held or locked in the raised position due to the fact that when the parts are in this position, the chamber 87 communicates with the atmosphere in the manner as will later be described, and therefore the pressure in chamber 88 will now be greater than that of the atmospheric pressure in chamber 87. The press will remain open until a pressure is developed in chamber 87 which is higher than that in chamber 88.

The main supply pressure when the parts are in the release position, is also conducted from passage 206 through passage 212 into the transverse passage 136 (Figure 4) which communicates with the interior of the right and left hand auxiliary slide valve housings 82 and 83 through the passage 139 and ports 143 and 154 respectively, which ports are positioned to one side of the slide valves 147 and 155 so as to conduct the fluid pressure into the housings 82 and 83. This pressure assists in holding the valves 147 and 155 firmly on their seats. The pressure exerted by the cam follower 170 on the member 162 associated with each of the valve housings 82 and 83, acts to move the slide valves 147 and 155 to their blank positions as soon as the handles 158 and 159 are released.

Figure 41:
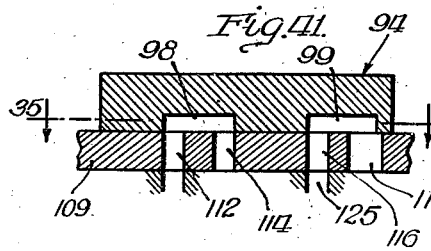
Figure 41 is a sectional view taken substantially along the line 41—41 of Figure 35.

The pistons 90 and 91 (Figure 7) are of the same diameter so that the pressure introduced into the chamber 89 will not affect the movement of these pistons. As previously described, the application chamber 87 in front of the piston 90 communicates with the atmosphere when the ports are in the raised or release position through the vertical offset cavity 213 on the inner face of the plate 209, port 214 (Figure 17) which communicates with port 215 in the housing 73, that in turn communicates with vertical passage 229 in the reservoir 74 (Figure 7). The passage 229 communicates with passage 202 through passage 137 (Figure 11). The fluid then passes through the needle valve 203, port 202' into the expansion chamber 200, which now opens to the atmosphere through the port 125 (Figure 18), port 116 (Figure 17), cavity 99 in valve 94 (Figure 41), port 118, and exhaust passage 224. The front chamber 199 and chamber 177' in the governor 84 now also communicates with the atmosphere through the passages 121, 220, 219 and 112, cavity 98 in the slide valve, and passages 114 and 223.

Figures 43 and 46 diagrammatically show the arrangement of the slide valve 94 and its associated parts in the release or inoperative position. Referring to Figure 46, it will be observed that the slide valve 94 is moved so that the opening 97 registers with the opening 117 in order to conduct the fluid pressure from the chamber 89 through the flexible connection 204 into the bottom of the cylinder 68 in order to raise the piston 64 and the head 55. The chambers 199 and 200 now communicate with the atmosphere through the registration of the cavities 98 and 99 with their complementary passages in the manner as previously described. As the piston 68 is moved upwardly, the fluid pressure is forced out through the coupling 230 and is conducted by the passages 120 and 111 into the cavity 101, thence through passages 113 and 122 to the bottom of the check valve 48 in the booster and upwardly through this valve into the pipe 47 where it mixes with the fresh supply in the coupling 204 before the latter is introduced into the bottom of the cylinder 64. In other words, a portion of the fluid pressure discharged from the top of the cylinder 64 is returned so as to mix with the fresh supply in order to raise the piston 68. A portion of the fluid pressure from the main supply pipe 205 is conducted by the passages 212 and 136 to the inside of the slide valve housings 82 and 83, respectively, and assists in holding the valves 148 and 155 on their seats. The manually operating handles 158 and 159 are maintained in their neutral position as indicated in Figure 43 by the cam followers 170 and their associated parts.

Figure 48:
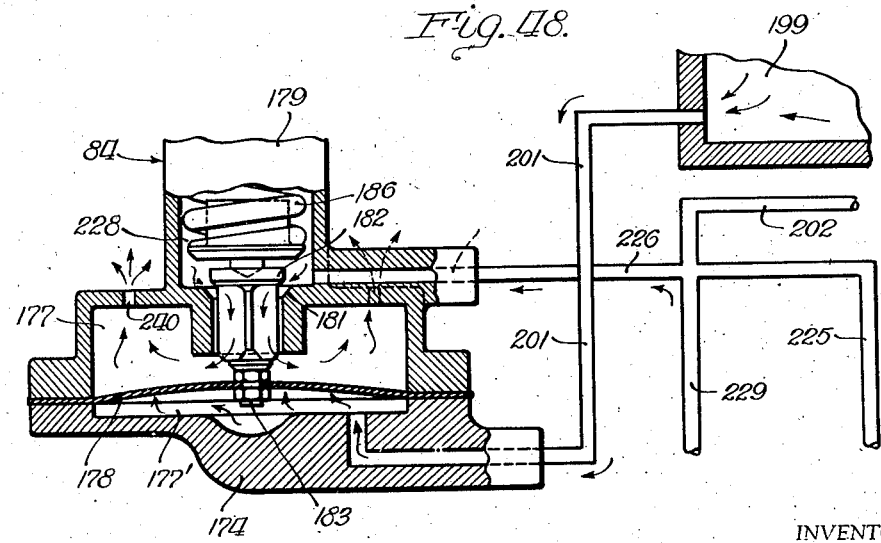
Figure 48 is a diagrammatic sectional view of the governor showing the diaphragm and valve in their raised position.

In release position, the vertical passage 120 in the housing 73 (Figure 7), which constitutes a continuation of the port 111 in the valve seat 109 communicates with a medially disposed passage 217 which extends longitudinally of the housing. The rear end of the passage 217 is connected through a cavity or slot 218 in the inner wall of the cap 210 with the release chamber 88 so that a portion of the fluid in the chamber 89 is carried to the chamber 88 to move and maintain the pistons 90 and 91 in their release position. The passage 217 has a forward portion 217' extending in front of the passage 120 so as to communicate through the needle valve 222 with a vertical passage 219 (Figure 7) that forms a continuation of the laterally offset or bent passage 220 (Figure 52) which empties into the passage 121 that is in direct communication with the top of the front or automatic release reservoir 199 (Figure 51). The flow of the fluid pressure medium from the chamber 199 (Figure 7) is conducted through the passage 201 into the chamber 177' (Figure 48) of the governor 84, below the diaphragm 178. When the pressure in the chamber 177' builds up sufficiently to overcome the set tension of the spring 186, the diaphragm 178 and the valve 182 will be raised (Figure 49) to allow the air in the application chamber 87 and the passages communicating therewith to escape through the openings 240 in the governor to the atmosphere.

The needle valve 222 (Figure 7) controls the rate of flow of the fluid pressure from the chamber 89 to the automatic release reservoir 199 and the chamber 177' of the governor 84 so as to provide an automatic time release for returning the presser head 55 from its applied to its release position. If the pistons 90 and 91 and the slide valve 94 should for any reason be in applied position (Figure 47) when the pressure is initially introduced into the chamber 89, the presser head 55 will momentarily be moved against the buck 51 and will immediately return to its release or inoperative position. This is due to the fact that since the auxiliary slide valves 147 and 155 are now in their neutral or lap position (Figure 43) and are held therein by the cam follower 170, the flow of the main supply is cut off from passage 135, so that any pressure in the application chamber 87 (Figure 7) will now exhaust or discharge into the expansion chamber 200 through passages 213, 214, and 229 into passage 202, needle valve 203 and passage 202'. Further, if the port 96 in the valve 94 should register with passage 111 at this time, the fluid would be conducted by passages 120, 217 and 218 to the release chamber 88; and the preponderance of pressure in the latter would cause the slide valve 94 and its associated parts to be moved to the left (Figure 7).

It will be seen that in the release position the chamber 87 as well as the chambers 199 and 200 discharge to the atmosphere, and that the presser head 55 will be maintained in its raised position relative to the buck 51 until the handles 158 and 159 are simultaneously actuated. Moreover, a portion of the fluid from the top of the cylinder 64 as it passes to the exhaust is returned through the passage 43, valve 48 and passage 47 so as to mix with the fresh supply in the passage 204 before the latter delivers to the bottom of the cylinder 64.

*Application position*

When the machine is initially charged with fluid pressure, the presser head 55 and its associated parts assume and are maintained in their raised or release position, as shown in Figure 1, so that the garment or article to be pressed may be properly placed on the buck 51 without danger of injuring the operator. When it is desired to close the press, it is necessary for the operator to apply both hands to the handles 158 and 159 (Figure 2), which handles are positioned to be conveniently used by the operator when the latter faces the front of the machine. If the operator should raise only the right hand slide valve 147, pressure would flow only to the left hand valve housing 83, but would not pass therethrough, since the cavity 157 in the left hand slide valve 155 would still be in its normal or blank position, due to the yieldable action of the cam follower 170 against its adjacent member 162. Conversely should the operator move the left hand slide valve 155 without disturbing the slide valve 147, the port 148 in the latter would not establish communication with passage 138 so that the fluid could not flow to the application chamber 87. It will therefore be necessary for the handles 158 and 159 to be actuated at the same time before the press can be closed.

Figure 42:
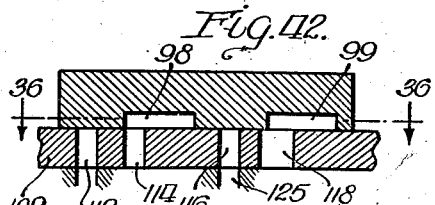
Figure 42 is a sectional view taken substantially along the line 42—42 of Figure 36.

When the handles 158 and 159 are simultaneously raised, the members 162 are moved in a clockwise direction (Figure 44) which moves the slide valves 147 and 155 so that the passage 148 (Figure 26) registers with the opening 141 communicating with the transverse continuous passages 138 and 135, which in turn communicate through the port 152 and cavity 157 (Figure 5) in the slide valve 155, with the opening 153 communicating with passages 140 and 137, so that the supply flows as indicated by the arrows in Figures 5 and 44. Thus it will be seen that the main supply pressure conveyed to the right hand valve chamber 82 is now conducted through passage 138 to the left hand valve cavity 157 and through the passage 140 and 137 to a downwardly extending passage 225 (Figure 11) which communicates through a port 226 with a passage 227 in the governor 84 (Figure 31) leading into the compartment or chamber 228 above the valve seat 181. A portion of this supply continues through the conduit 137 to the vertical passage 229 (Figure 49) and through the cavity 213 so as to conduct the fluid pressure to the chamber 87 in front of the application piston 90 in order to move the latter and its associated parts to the applied or press closing position, as diagrammatically illustrated in Figures 44 and 47. At the same time a portion of the main fluid supply is carried by passage 137 through conduit 202 and past the needle valve 203 into the rear expansion chamber 200 (Figure 7). It will be noted that at this time the slide valve 94 is moved to cut off communication of the passages 112 and 116 with the atmosphere (Figure 42).

Figure 40:
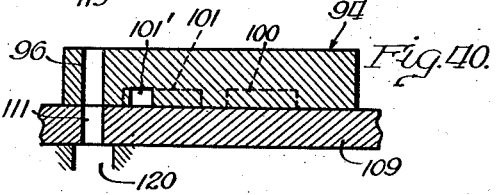
Figure 40 is a sectional view taken substantially along the line 40—40 of Figure 36.

The simultaneous movement of the pistons 90, 91 and the slide valve 94 to the right, as particularly shown in Figure 40, causes registration of the port 96 in the slide valve with the ports 111 and 120 (Figure 22) which aligns with port 128 (Figure 19) communicating with the top of the power cylinder 64, through the flexible connection 230, so as to move the piston 68 downwardly, thus moving the presser head 55 in pressing engagement with the work and the stationary buck 51. At the same time, a portion of the pressure in the passage 120 (Figure 7) is now carried by the branch passage 217 to the release chamber 88 in front of the piston 91. Some of this pressure is also conducted by passage 217' past the needle valve 222, through the passages 219 and 121 (Figure 8) to the front or automatic release reservoir 199 and then to the governor chamber 177' below the diaphragm 178 (Figure 47).

As the pressure flows through the passage 128, (Figure 19), a portion thereof is conducted by the conduit 231 in the booster (Figure 19) to a chamber 232 above a non-return check valve 233 (Figure 23) in a recess 234 and assists in maintaining the check valve 233 closed until the booster action takes place. In the press closing position, the slide valve 94 is moved so that the cavity 100 (Figure 38) in the slide valve establishes communication between the ports 115 and 117 in the slide valve seat 109 which register with the ports 124 and 126, respectively, in the reservoir 74, thus permitting the pressure to exhaust upon the downward stroke of the piston 68 from the bottom of the cylinder 64 through the flexible connection 204, ports 131, 126 and 117, across cavity 111, (Figure 38) down ports 115, 124 and 130 (Figure 22) to port 133, muffler 77 and thence to the atmosphere (Figure 47). As this fluid pressure passes through the booster, it flows through a lateral passage 235 which communicates with the underside of the check valve 233 (Figure 23) so as to lift this valve off its seat momentarily, thus allowing the fluid to pass through passage 231 and port 128 so as to mix with the main supply passing through the flexible connection 230 to the top of the piston 68. Thus, it will be seen that the booster 76 provides means for conserving or using a portion of the fluid pressure medium which would otherwise be dissipated, by conducting the same from both the top and the bottom of the cylinder 64 so as to mix with the fresh fluid supply admitted into opposite sides of the cylinder through the passages 204 and 230 respectively, during the operation of the press.

The notch or recess 102 in the cavity 101 (Figure 35) is provided to accelerate the flow of the fluid supply from the application chamber 87 to the exhaust before the escape of the fluid pressure in the motor 64 is removed. Each of the needle valves 203 and 222 is mounted in its respective passage so as to be readily adjustable and may be concealed therein by a removable threaded plug 237. Extending outwardly from the front of the frame 50 (Figure 1) and above the control unit 70 is a guard rail or apron which may be suitably connected to the top of the machine.

The needle valve 203 (Figure 7) which controls the flow of the main pressure supply leading from the passage 137 and the application chamber 87 in front of the piston 90, to the expansion chamber 200, is adjusted so that the fluid pressure in expansion chamber 200 will reach substantially that of the pressure source or chamber 89 in an adjustable predetermined period, such as five seconds, and constitutes a safety feature requiring the manually operable valves 147 and 155 to be maintained in their operative position (Figure 44) for a fixed interval after the press is closed. By virtue of this arrangement the press may be closed for short pressing operations independently of the governor 84 and will release upon the release of the handles 158 and 159, to open the press.

Figures 35, 36:
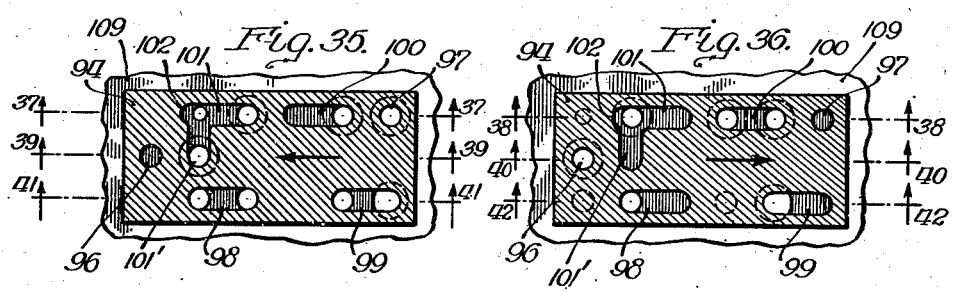
Figure 35 is a sectional view taken substantially along the line 35—35 of Figure 41.
Figure 36 is a sectional plan view taken substantially along the line 36—36 of Figure 42.

Should it be desired to move the presser head 55 in engagement with the work for a shorter period than that for which the needle valve 203 has been adjusted, the head 55 may automatically be moved to its opened or inoperative position at any time prior to this event upon the release of the manually operated handles 158 and 159. In other words, upon the initial raising of both of these handles, fluid pressure from the valves 147 and 155 is conducted to the chamber 87 in front of the piston 90 through passage 229 and its associated passages to move the pistons 90 and 91 and slide valve 94 to their applied positions (Figure 44). Upon the operator releasing handles 158 and 159, the cam followers 170 are urged by the springs 173 to return the handles 158 and 159 to their normal or neutral position, which in turn move the slide valve 147 and 155 (Figure 43) to their neutral positions, thus blanking all supply pressure ports leading through the auxiliary or hand valve housings 82 and 83. As there is now no pressure supply to the application chamber 87, this pressure is allowed to empty and expand into the rear chamber or reservoir 200 through the communicating passages 137, 202 and 202' (Figure 7) at a given rate, and in accordance with the control or adjustment of the needle valve 203. When the pressure in the application chamber 87 drops below that in the release chamber 88, the preponderance of pressure in the latter chamber forces the pistons 90 and 91 together with the main slide valve 94 back to their release or press opening position (Figure 7). The ports and cavities in the slide valve 94 are now returned to the position as shown in Figure 35, with the result that the exhaust cavity 101 establishes communication between the ports 111 and 113 so that the fluid pressure in the top of the cylinder 68 is conducted to the muffler 77 which communicates with the atmosphere, and a portion of this fluid is allowed to mix with the fresh supply in passage 204, as previously set forth. At the same time, cavity 99 in the slide valve 94 establishes communication between the ports 116 and 118 so as to exhaust the fluid pressure in the chambers 87, 199 and 200 through the ports 223 and 224 in the manner as previously described.

Figure 34:
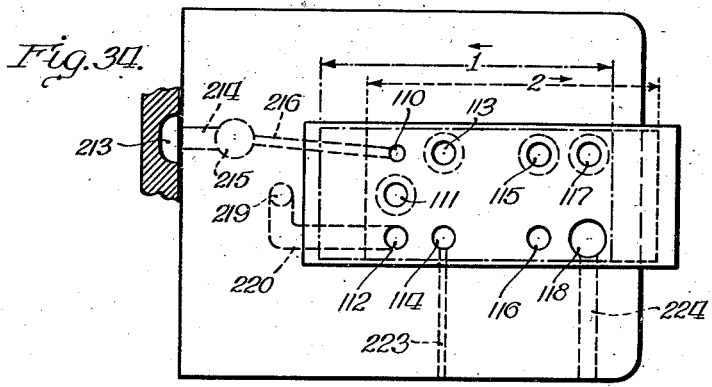
Figure 34 is a diagrammatic plan view of the main slide valve seat and its associated parts.

Should the operator desire to have the press closed for a predetermined period beyond that required for a short pressing operation, he holds the right and left hand valve handles 158 and 159 raised for a sufficient length of time, to allow the expansion chamber 200 to be filled. The needle valve 203 may be set to create a fluid pressure in the expansion chamber 200 equal to that of the application chamber 87 in any given period of time. For the purpose of illustration, this period has been taken as five seconds. Consequently upon the operator raising handles 158 and 159 so as to hold valves 147 and 155 open for five seconds (Figure 44), the fluid pressure in the application chamber 87 will equalize with that in the expansion chamber 200, at the end of this period so as to maintain or lock the main slide valve 94 and its associated parts in their closed position. At the same time the pressure from the main supply chamber 89 and automatic release chamber 199 builds up in the chamber 177' of the governor 84, until it is greater than that which the spring 186 has been set by the adjustment of the handle 190 to exert against the valve 181. Assuming that this period is twenty seconds, it will be seen that at the expiration of this period, the diaphragm 178 is deflected and moved to the position shown in Figure 48 so as to raise the valve 182 from its seat. The fluid pressure in the chamber 177 now exhausts to the atmosphere through the openings 240. Since the application chamber 87 in front of the piston 90 now communicates with the chamber 177 through the passages 213, 214, 215 (Figure 34) 229, 137, 225, 226 (Figure 11) and passage 227 (Figure 48), the preponderance of pressure in chamber 88 will cause the slide valve and its associated parts to be returned to their released position and the press to be opened.

The automatic release operation may be described as follows: The rate of supply of fluid from the main chamber 89 to the automatic release chamber or reservoir 199 and to the chamber 177' of the governor 84 is controlled by the needle valve 222. The needle valve 222 is so adjusted as to fill the automatic release chamber 199 at a slower rate than the needle valve 203 is adjusted to fill the expansion chamber 200. It will be seen that the conduits leading to the expansion chamber 200 also lead to the chamber 87 which results in the full pressure being built up in the expansion chamber 200 only after the press has encountered a resistance such as a garment on the buck, since the main piston 68 is in motion while closing the press and there is a pressure drag due to the flow of fluid through the several fluid passages until the motion of the piston is stopped and a static condition prevails. It is necessary that the fluid pressure in expansion chamber 200 be substantially the same as that at the source in order that the main slide valve 94 may be locked in the applied position. In the event either of the manually operable valves 147 and 155 be released prior to the establishment of this pressure in the expansion chamber 200, the opposing pressure on piston 91 will shift the main valve 94 back to the release position which causes the press to be immediately opened.

Figure 45:
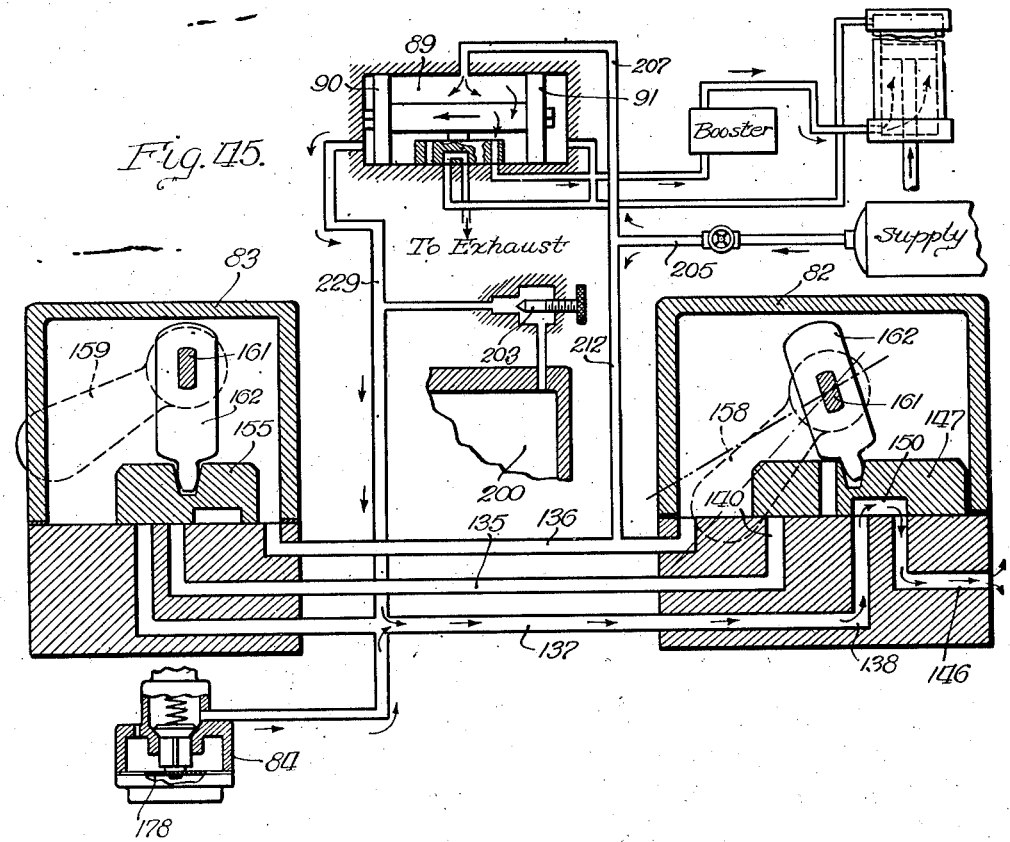
Figure 45 is a diagrammatic view similar to Figure 43 showing the right hand slide valve in manually released position as shown in Figure 27 and with the left hand slide valve either in its open or closed position.

The cavity 150 (Figure 43) in the slide valve 147 is arranged to establish communication between the ports 142 and 145 in the valve seat of the housing 82, so that should the operator desire to release the press before it has released automatically as outlined above, this may be done upon the lowering of the handle 158, which moves the member 162 in a counter-clockwise direction to move the valve 147 to the right (Figure 27), so that the cavity 150 will overlap the ports 142 and 145 to permit the pressure in the application chamber 87 and passage 137 to exhaust to the atmosphere through port 146 (Figure 45).

It will be observed that regardless of the thickness or size of the fabric or material to be pressed or treated, the main slide valve 94 and its associated parts are locked in press closing position by virtue of the fact that the automatic slide valve 94 will not move to released position until the pressure in the application chamber 87 becomes lower than the pressure in the release chamber 88. This locking feature of the parts when the press is in its closed or operative position may be changed in three ways:

(1) When a short pressing period of the material is desired, the application chamber 87 pressure is transferred to the expansion chamber 200 at a given rate as controlled by the adjustable needle valve 203. If the handles 158 and 159 are released before the expiration of the period, e. g., five seconds, the press is immediately returned to its open position for the reason as previously described.

(2) By automatically relieving the pressure in the application chamber 87 through the lifting of the diaphragm 178 to unseat the retaining valve 182 at the end of the predetermined pressing interval, thus allowing the pressure in the application chamber 87 to escape to the atmosphere through the ports or openings 240.

(3) Operator may manually relieve the pressure in the application chamber 87 by moving the slide valve arm 162 (Figure 27) so as to permit the discharge of the pressure to the atmosphere through the ports 145 and 146. Thus it will be seen that means are provided for opening the press at any time desired upon depressing the right hand lever 158 which communicates the chamber 87 and its associated passages with the atmosphere. In releasing the pressure from the application piston 87, the preponderance of pressure now in the release chamber 88 will move the slide valve 94 and its associated parts to the press opening position.

As will be observed, the pressure in the rear chamber 88 behind the piston 91 tends to normally maintain the presser head 55 and its associated parts in their raised position. At the same time, the manually operable handles 158 and 159 are yieldably held in their neutral or blanked position by the cam followers 170 and the springs 167.

If upon the actuation of the handles 158 and 159, the operator should release either of these handles before the pressure in expansion chamber 200 becomes equal to that of chamber 87, the flow of the pressure to the expansion chamber 200 will act to immediately cause the return of the press to its open position, even though the press has started to move downwardly to its applied position.

In the event the main slide valve 94 and its associated parts should be in their applied position when the fluid pressure is initially introduced into the machine, the press would be momentarily closed, but will immediately thereafter return to its raised or opened position, since the pressure in front of the piston 90 would exhaust into the expansion chamber 200, due to the fact that the neutral position of the auxiliary slide valves 147 and 155 has not been disturbed, and consequently the preponderance of pressure now applied to the release piston 91 will cause the slide valve 94 and its associated parts to be moved to their release position and retained therein.

The position and arrangement of the various parts when the press is in its raised or open position is diagrammatically shown in Figures 43 and 44 while Figures 44 and 47 disclose the arrangement of the various parts when the press is closed. It will be noted that the duration of the pressing operation is under the direct control of the operator and may be varied or changed as the particular work requires. Thus if it is desired for the press to be closed for a short duration the operator upon raising the handles 148 and 149 can either immediately release the same or release them before the expiration of the predetermined period, i. e., five seconds which results in the slide valve 94 and its associated parts being returned to their released position and the presser head being raised away from the work. This set interval, of course, may be readily changed or varied by the adjustment of the needle valve 222 which controls the flow of the liquid supply to the chambers 199 and 177'. If the press is to remain closed for its maximum duration then the handle 158 and 159 are retained raised by the operator for five seconds and then released. The press will then remain closed for twenty seconds or the duration, the needle valve 203 has been set to allow the fluid pressure in the chamber 200 to equalize with that in the chamber 89. This interval likewise can be changed by the adjustment of the needle valve 203 and independently of the needle valve 222. Further, if for any reason it is desired to facilitate the return of the slide valve 94 and its associated parts to their released position, this may be done by lowering or depressing the handle 158 of the slide valve 147 so as to establish communication of the chamber 87 with the atmosphere through the passage 138, cavity 150 and port 146 (Figure 45).

It will be appreciated that the size and arrangement of the various ports and intercommunicating passages may be varied or changed in order to increase the efficiency of operation of the press and as existing operating conditions may require without affecting the principle and mode of operation of the control unit and its associated parts.

Thus it will be seen that simple, efficient, and economical means are provided for moving and maintaining the press head 55 or other operable member in a fixed position, and in which automatically time release means are provided for maintaining the press closed, and for automatically releasing the same at the expiration of a predetermined interval, and in which the press may be used to work on material of different thicknesses and be maintained in firm and uniform pressing engagement therewith irrespective of the thickness of the material, and without requiring any changes or readjustment of the parts.

It is to be understood that the form of the invention shown and described is merely illustrative of a preferred embodiment, and that such changes may be made as fall within the purview of one skilled in the art without departure from the spirit of the invention and the scope of the appended claims.

What is claimed is:

1. In combination with an operable member alternately movable from release to applied positions, a fluid pressure motor connected to said member for actuating the same, a control unit for supplying fluid pressure to the motor, said control unit including a housing for receiving the fluid pressure, means communicating the housing with the motor, a main slide valve in said housing for controlling the supply of the fluid pressure through the communicating means, spaced pistons for actuating the slide valve, one of said pistons constituting an application piston and the other a release piston, said slide valve upon the initial introduction of the pressure into the housing being positioned to effect the flow of the pressure from the housing to the motor to move the operable member to its release position, means communicating the application piston with the pressure supply to move the slide valve and operable member to their applied positions, a pair of spaced auxiliary valves for controlling the flow of the pressure to the application piston, means upon the simultaneous actuation of the auxiliary valves for conducting the pressure to the application piston so as to actuate the slide valve and move the operable member to its applied position, governor means communicating with the housing for automatically returning the main slide valve and the operable member to their release position at the expiration of a predetermined interval, and manually controlled means for returning the operable member to its release position at any time before the expiration of the predetermined period.

2. In combination with an operable member alternately movable from release to applied positions, a fluid pressure motor connected to said member for actuating the same, a control unit for supplying fluid pressure to the motor, said control unit including a housing for receiving the fluid pressure, means communicating the housing with the motor, a main slide valve in said housing for controlling the supply of the fluid pressure through the communicating means, spaced pistons in said housing for actuating the slide valve, one of said pistons constituting an application piston and the other a release piston, said slide valve upon the initial introduction of the pressure into the housing being positioned to effect the flow of the pressure from the housing to the motor to move the operable member to its release position, means communicating the application piston with the pressure supply to move the slide valve and operable member to their applied positions, a pair of spaced auxiliary valves for controlling the flow of the pressure to the application piston, manually operable means for actuating the auxiliary valves, means upon the release of the manually operable means for returning the auxiliary valves to their initial positions, and means operable upon the release of the manually operable means for reducing the pressure in front of the application piston so as to create a preponderance of pressure in front of the release piston to return the operable member to its released position.

3. In combination with an operable member alternately movable from release to applied positions, a fluid pressure motor connected to said member for actuating the same, a control unit for supplying fluid pressure to the motor, said control unit including a housing for receiving the fluid pressure, means communicating the housing with the motor, a main slide valve in said housing for controlling the supply of the fluid pressure through the communicating means, spaced pressure operable pistons in said housing for actuating the slide valve, one of said pistons constituting an application piston and the other a release piston, said slide valve upon the initial introduction of the pressure into the housing being positioned to effect the flow of the pressure from the housing to the motor to move the operable member to its released position, means for maintaining the operable member in its released position, a pressure receiving casing, a pressure discharging casing, means for introducing the fluid pressure into one of said casings, a communicating passage between said casings, an auxiliary valve in each casing for controlling the flow of the pressure from one casing to the other, said discharge casing having a passage communicating with the housing in front of the application piston, means communicating the pressure in the housing to the front of the release piston, and means for manually operating said auxiliary valves so that upon the simultaneous movement of the auxiliary valves to establish a preponderance of pressure in front of the application piston so as to move the slide valve and the operable member to their applied positions.

4. In combination with an operable member alternately movable from release to applied positions, a fluid pressure motor connected to said member for actuating the same, a control unit for supplying fluid pressure to the motor, said control unit including a housing for receiving the fluid pressure, means communicating the housing with the motor, a main slide valve in said housing for controlling the supply of the fluid pressure through the communicating means, spaced pressure operable pistons in said housing for actuating the slide valve, one of said pistons constituting an application piston and the other a release piston, said slide valve upon the initial introduction of the pressure into the housing being positioned to effect the flow of the pressure from the housing to the motor to move the operable member to its released position, a pressure receiving casing, a pressure discharging casing, means for introducing the fluid pressure into said casings, said casings having a communicating passage therebetween, an auxiliary slide valve in each casing for controlling the flow of the pressure from one casing to the other, said discharge casing having a passage communicating with the housing in front of the application piston, means for conducting the fluid pressure to the front of the release piston, means for manually operating said auxiliary slide valves so that upon the simultaneous movement of the auxiliary valves to release the pressure communicating with the release piston and establish a preponderance of pressure in front of the application piston to move the slide valve and the operable member to their applied positions, means for maintaining the operable member in its applied position for a predetermined period, and means for releasing and returning the operable member to its release position at any time before the expiration of the predetermined period.

5. In combination with an operable member alternately movable from release to applied positions, a fluid pressure motor connected to said member for actuating the same, a control unit for supplying fluid pressure to the motor, said control unit including a housing for receiving the fluid pressure, means communicating the housing with the motor, a main slide valve in said housing for controlling the supply of the fluid pressure through the communicating means, spaced pressure operable pistons in said housing for actuating the slide valve, one of said pistons constituting an application piston and the other a release piston, said slide valve upon the initial introduction of the fluid pressure into the housing being positioned to effect the flow of the pressure from the housing to the motor to move the operable member to its release position, a pressure receiving casing, a pressure discharging casing, means for introducing the fluid pressure into said casings, said casings having a communicating passage, an auxiliary slide valve in each casing for controlling the flow of the pressure from one casing to the other, said discharge casing having a passage communicating with the housing in front of the application piston, means including said main slide valve for communicating the pressure in the housing with the release piston when said slide valve is actuated by the application piston, means for manually operating said auxiliary slide valves so that upon the simultaneous movement of the auxiliary valves to apply pressure to the application piston to move the slide valve and the operable member to their applied positions, means for maintaining the operable member in its applied position for a predetermined period, means for exhausting the pressure from opposite ends of the motor to the atmosphere, and a booster communicating with the motor for returning a portion of the used fluid pressure before it is discharged to the atmosphere so that the same may be reused to operate the motor.

6. In combination with an operable member alternately movable from release to applied positions, a fluid pressure motor connected to said member for actuating the same, a control unit for supplying fluid pressure to the motor, said control unit including a housing for receiving the fluid pressure, means communicating the housing with the motor, a slide valve in said housing for controlling the supply of the fluid pressure through the communicating means, spaced pressure operable pistons for actuating the slide valve, one of said pistons constituting an application piston and the other a release piston, said slide valve upon the initial introduction of the pressure into the housing being positioned to effect the flow of the pressure from the housing to the motor to move the operable member to its released position, a pressure receiving casing, a pressure discharging casing, means for introducing the fluid pressure into said casings, said casings having a communicating passage, an auxiliary valve in each casing for controlling the flow of the pressure from one casing to the other, said discharge casing having a passage communicating with the housing in front of the application piston, means communicating the pressure in the housing with the release piston, means for manually operating said auxiliary valves so that upon the simultaneous movement thereof to conduct the pressure to the application piston to move the slide valve and the operable member to their applied positions, yieldable means for normally maintaining the auxiliary valves in their blank or neutral position, means effective upon the actuation of the auxiliary valves to move the operable member to its applied position, means for locking the operable member in its applied position when the auxiliary valves are held open for a predetermined period, and means upon the release of the auxiliary valves at any time before the expiration of the predetermined period, for immediately returning the operable member to its released position.

7. In combination with an operable member alternately movable from release to applied positions, a fluid pressure motor connected to said member for actuating the same, a control unit for supplying fluid pressure to the motor, said control unit including a housing for receiving the fluid pressure, means communicating the housing with the motor, a slide valve in said housing for controlling the supply of the fluid pressure through the communicating means, spaced pressure operable pistons in said housing for actuating the slide valve, one of said pistons constituting an application piston and the other a release piston, said slide valve upon the initial introduction of the pressure into the housing being positioned to effect the flow of the pressure from the housing to the motor to move the operable member to its released position, a pressure receiving casing, a pressure discharging casing, said casings having a communicating passage, an auxiliary valve in each casing for controlling the flow of the pressure from one casing to the other, said discharge casing having a passage communicating with the housing in front of the application piston, means communicating the pressure in the housing with the release piston, means for manually operating said auxiliary valves so that upon the simultaneous movement thereof to conduct the pressure to the application piston to move the slide valve and the operable member to their applied positions, yieldable means for normally maintaining the auxiliary valves in their blank or neutral position, means upon the actuation of the auxiliary valves to move the operable member to its applied position, means for locking the operable member in this position when the auxiliary valves are held open for a predetermined period, means upon the release of the auxiliary valves at any time before the expiration of the predetermined period, for returning the operable member to its released position, and means in the receiving casing for establishing communication of the fluid pressure with the atmosphere.

8. The combination with an operable member alternately movable from release to applied positions, a fluid pressure motor connected to said member for actuating the same, a control unit for supplying fluid pressure to the motor, said control unit including a housing for receiving the fluid pressure, means communicating the housing with the motor, a slide valve in said housing for controlling the supply of the fluid pressure through the communicating means, spaced pressure operable pistons for actuating the slide valve, one of said pistons constituting an application piston and the other a release piston, said slide valve upon the initial introduction of the pressure into the housing being positioned to effect the flow of the pressure from the housing to the motor to move the operable member to its released position, a pressure receiving casing, a pressure discharging casing, said casings having a communicating passage, an auxiliary valve in each casing for controlling the flow of the pressure from one casing to the other, said discharge casing having a passage communicating with the housing in front of the application piston, means communicating the pressure in the housing with the release piston, means for manually operating said auxiliary valves so that upon the simultaneous movement thereof the pressure is conducted to the application piston to move the slide valve and the operable member to their applied positions, yieldable means for normally maintaining the auxiliary valves in their blank or neutral position, means upon the actuation of the auxiliary valves to move the operable member to its applied position, means for locking the operable member in this position when the auxiliary valves are held open for a predetermined period, means upon the release of the auxiliary valves at any time before the expiration of the predetermined period, for immediately returning the operable member to its released position, said receiving casing having a port communicating with the atmosphere, and the slide valve in said receiving casing arranged to establish communication of the pressure conducted to the application piston with said port when moved in a given direction.

9. In combination with an operable member alternately moving from a released to an applied position, a fluid pressure motor connected to said member for actuating the same, a control unit for supplying fluid pressure to the motor, said control unit including a housing having end chambers and an intermediate chamber, an application piston in one of the end chambers, a release piston in the other end chamber, a common piston rod extending through the intermediate chamber and connected to said pistons for simultaneously actuating the same, means for introducing fluid pressure into the intermediate chamber, said intermediate chamber having spaced passages, one of which communicates with one side of the motor and the other of which communicates with the opposite side thereof, a slide valve in said housing for controlling the flow of the pressure to said motor, said slide valve upon the initial introduction of the pressure being positioned to effect the flow of the pressure from the housing to the motor to move the operable member to its released position, means for maintaining the operable member in its released position, means communicating the pressure in the intermediate chamber to the front of the release piston, said slide valve controlling the flow through said communicating means, a pair of spaced casings, means for conducting pressure into one of said casings, said casings having a communicating passage, and auxiliary valve in each of said casings for controlling the flow of the fluid from one casing to the other, manually operable means for actuating each of the auxiliary valves, yieldable means for normally maintaining the auxiliary valves in their neutral position, said auxiliary valves upon being simultaneously operated being movable to establish communication of the pressure in one casing with the application chamber so as to move the main slide valve and the operable member to their applied positions, a governor, and means communicating the governor with the intermediate chamber, said main slide valve controlling the flow of the pressure in the intermediate chamber to said governor, said governor when the slide valve is in its applied position acting to maintain the operable member locked for a predetermined period and automatically releasing the same at the expiration of this period.

10. In combination with an operable member alternately movable from a released to an applied position, a fluid pressure motor connected to said member for actuating the same, a control unit for supplying fluid pressure to the motor, said control unit including a housing for receiving the fluid pressure, means communicating the housing with the motor, a main slide valve in said housing for controlling the supply of the fluid pressure through the communicating means, spaced pressure operable pistons in said housing for actuating the slide valve, said slide valve upon the initial introduction of the pressure into the housing being positioned to effect the flow of the pressure from the housing to the motor to move the operable member to its released position, a pressure receiving casing, a pressure discharging casing, said casings having a communicating passage, an auxiliary valve in each casing for controlling the flow of the pressure from one casing to the other, said discharge casing having a passage communicating with the housing in front of one of the pistons, means for manually operating said auxiliary valves so that upon the simultaneous movement of the auxiliary valves to move the slide valve and the operable member to their applied positions, yieldable means for normally maintaining the auxiliary valves in their blank positions, means upon the actuation of the auxiliary valves to move the operable member to its applied position for locking the same in this position when the auxiliary valves are held open for a predetermined period, means upon the release of the auxiliary valves at any time before the expiration of the predetermined period for returning the operable member to its released position, and means upon the release of the manually operating means for returning the operable member to its released position.

11. In combination with an operable member alternately movable from a released to an applied position, a fluid pressure motor connected to said member for actuating the same, a control unit for supplying fluid pressure to the motor, said control unit including a housing for receiving the fluid pressure, means communicating the housing with the motor, a slide valve in said housing for controlling the supply of the fluid pressure through the communicating means, spaced pressure operable pistons in said housing for actuating the slide valve, said slide valve upon the initial introduction of the pressure into the housing being positioned to effect the flow of the pressure from the housing to the motor to move the operable member to its released position, means for maintaining the operable member in its released position, a pressure receiving casing, a pressure discharging casing, said casings having a communicating passage, an auxiliary valve in each casing for controlling the flow of the pressure from one casing to the other, said discharge casing having a passage communicating with the housing in front of one of the pistons, means communicating the pressure in the housing with the other of said pistons, means for manually operating said auxiliary valves so that upon the simultaneous movement of the auxiliary valves to move the slide valve and the operable member to their applied positions, yieldable means for normally maintaining the auxiliary valves in their blank positions, means upon the actuation of the auxiliary valves to move the press to its applied position for locking the press in this position when the auxiliary valves are held open for a predetermined period, means upon the release of the auxiliary valves at any time before the expiration of the predetermined period for returning the operable member to its relased position, and governor means communicating with the application chamber for returning the operable member to its released position at the expiration of a predetermined period.

12. A press of the class described having in combination a buck, a presser head movable into and out of engagement with the buck, a fluid pressure motor connected to the presser head for actuating the same, a control unit for supplying fluid pressure to the motor to move the presser head, said control unit including a housing for receiving the fluid pressure, means communicating the housing with the motor, a slidable valve controlling the supply of the fluid pressure through the communicating means, pressure operable means in said housing for actuating the slide valve, means for supplying pressure to the pressure operable means, manually operable members controlling the flow of the pressure to the pressure operable means so that upon the simultaneous movement of the operable members to effect the movement of the slide valve and the presser head, means for maintaining the presser head in engagement with the buck for a predetermined period, means for releasing the presser from the buck before the expiration of the predetermined period, and means for maintaining the presser head in engagement with the buck after the expiration of the predetermined period.

13. A press of the class described having in combination a buck, a presser head movable into and out of engagement with the buck, a fluid pressure motor connected to the presser head for actuating the same, a control unit for supplying pressure to the motor to move the presser head, said control unit including a housing for receiving the fluid pressure, means communicating the housing with the motor, a slide valve controlling the supply of the fluid pressure through the communicating means, pressure operable means in said housing for actuating the slide valve, means for supplying pressure to the pressure operable means, spaced manually operable members controlling the flow of the pressure to the pressure operable means so that upon the simultaneous movement of the operable members to effect the movement of the slide valve and the presser head, means for maintaining the presser head in engagement with the buck for a predetermined period, when said spaced members are maintained operated for a predetermined time interval, and means upon release of the spaced members before the expiration of the predetermined interval for releasing the presser head immediately from engagement with the buck.

14. A press of the class described having in combination a buck, a presser head movable into and out of engagement with the buck, a fluid pressure motor connected to said head for actuating the same, a control unit for selectively supplying fluid pressure to opposite sides of the motor to move the presser head relative to the buck, said control unit including a housing for receiving the main supply of fluid pressure, a valve in said housing for controlling the supply of the fluid from the housing to opposite sides of the motor, pressure operable means for actuating the slide valve, means for supplying fluid pressure to the pressure operable means, manually operable valves for controlling the flow of the fluid pressure to the pressure operable means, and a booster communicating with opposite sides of the motor for returning a portion of the used fluid to mix with the main supply to operate the motor.

15. A press of the class described having in combination a buck, a presser head movable into and out of engagement with the buck, a fluid pressure motor connected to said head for actuating the same, a control unit for selectively supply fluid pressure to opposite sides of the motor to move the presser head relative to the buck, said control unit including a housing for receiving the fluid pressure, a slidable valve in said housing for controlling the supply of the pressure from the housing to opposite sides of the motor, pressure operable means for actuating the slide valve, a pair of spaced casings, means for conducting pressure into one of said casings, said casings having a communicating passage, an auxiliary valve in each of said casings for controlling the flow of the supply through the casings, manually operable members for actuating the auxiliary valves, yieldable means for normally maintaining the auxiliary valves in their neutral position, said auxiliary valves when simultaneously actuated being movable to establish communication of the fluid pressure in one casing with the application chamber to move the presser head in one direction, and means upon the release of the manually operable members for moving the presser head in an opposite direction.

16. A press of the class described having in combination a buck, a presser head movable into and out of engagement with the buck, a fluid pressure motor connected to said head for actuating the same, a control unit for supplying fluid pressure to the motor, said control unit including a housing for receiving the fluid pressure, means communicating the housing with the motor, a main slide valve in said housing for controlling the supply of the pressure through the communicating means, spaced pistons for actuating the slide valve, one of said pistons constituting an application piston and the other a release piston, said slide valve upon the initial introduction of the pressure into the housing being positioned to effect the flow of the pressure from the housing to the motor to move the pressure head to its released position relative to the buck, a pair of spaced auxiliary valves controlling the flow of the pressure to the application piston, manually operable means for actuating the auxiliary valves, means upon the release of the manually operable means for returning the auxiliary valves to their initial or blank position, means for applying fluid pressure to the front of the release piston, and means operable upon the release of the manually operable means for reducing the fluid pressure in front of the application piston to create a preponderance of pressure in front of the release piston to move the presser head away from the buck.

17. A press of the class described having in combination a buck, a presser head movable into and out of engagement with the buck, a fluid pressure motor connected to said head for actuating the same, a control unit for supply fluid pressure to the motor, said control unit including a housing for receiving the fluid pressure, means communicating the housing with the motor, a main slide valve in said housing for controlling the supply of the pressure through the communicating means, spaced pistons for actuating the slide valve, one of said pistons constituting an application piston and the other a release piston, said slide valve upon the initial introduction of the pressure into the housing being positioned to effect the flow of the pressure from the housing to the motor to move the presser head to its released position relative to the buck, means communicating the application piston with the pressure supply to actuate the slide valve to move the presser head into engagement with the buck, a pair of spaced auxiliary slide valves controlling the flow of the pressure to the application piston, manually operable means for actuating the auxiliary slide valves, means upon the release of the manually operable means for returning the auxiliary slide valves to their initial or blank position, means for applying fluid pressure to the front of the release piston, and means operable upon the release of the manually operable means for reducing the pressure in front of the application piston to create a preponderance of pressure in front of the release piston to move the presser head away from the buck, means up on the actuation of the manually operable means to move and to maintain the presser head in engagement with the buck for a predetermined period and for releasing the same at the expiration of this period.

18. A press of the class described having in combination a buck, a presser head movable into and out of engagement with the buck, a fluid pressure motor connected to said head for actuating the same, a control unit for supplying fluid pressure to the motor, said control unit including a housing for receiving the fluid pressure, means communicating the housing with the motor, a main slide valve in said housing for controlling the supply of the pressure through the communicating means, spaced pistons for actuating the slide valve, one of said pistons constituting an application piston and the other a release piston, said slide valve upon the initial introduction of the pressure into the housing being positioned to effect the flow of the pressure from the housing to the motor to move the presser head to its released position relative to the buck, means communicating the application piston with the pressure supply to actuate the slide valve to move the presser head into engagement with the buck, a pair of spaced auxiliary valves controlling the flow of the pressure to the application piston, manually operable means for actuating the auxiliary valves, means upon the release of the manually operable means for returning the auxiliary valves to their initial or blank position, means operable upon the release of the manually operable means for reducing the pressure in front of the application piston to create a preponderance of pressure in front of the release piston to move the presser head away from the buck, means upon the actuation of the manually operable means for a predetermined interval to move and to maintain the presser head in engagement with the buck for a predetermined period and for releasing the same at the expiration of this period, and means upon release of either or both of the manually operable members at any time before the expiration of the predetermined interval for moving the presser head away from the buck.

ROBERT L. HOLBROOK,
*Administrator of James A. Hicks, Deceased.*